(12) United States Patent
Satou et al.

(10) Patent No.: US 8,397,347 B2
(45) Date of Patent: Mar. 19, 2013

(54) TURNING DEVICE, AND FOLDING TYPE PORTABLE TERMINAL EQUIPPED WITH THE SAME

(75) Inventors: Noriyoshi Satou, Yokohama (JP);
Kazuhiro Konishi, Yokohama (JP);
Kazunori Kouno, Yokohama (JP); Eiji Nishimura, Yokohama (JP)

(73) Assignee: Panasonic Corporation, Osaka (JP)

( * ) Notice: Subject to any disclaimer, the term of this patent is extended or adjusted under 35 U.S.C. 154(b) by 422 days.

(21) Appl. No.: 12/681,777

(22) PCT Filed: Apr. 25, 2008

(86) PCT No.: PCT/JP2008/001102
§ 371 (c)(1),
(2), (4) Date: Apr. 5, 2010

(87) PCT Pub. No.: WO2009/044496
PCT Pub. Date: Apr. 9, 2009

(65) Prior Publication Data
US 2010/0212111 A1    Aug. 26, 2010

(30) Foreign Application Priority Data

Oct. 5, 2007   (JP) .................................. 2007-262394
Nov. 7, 2007   (JP) .................................. 2007-289989

(51) Int. Cl.
*E05C 17/64*    (2006.01)
(52) U.S. Cl. ................... 16/342; 16/337; 16/319
(58) Field of Classification Search .................... 16/319, 16/321, 337, 342, 355, 356, 367, 374–377, 16/252, 380
See application file for complete search history.

(56) References Cited

U.S. PATENT DOCUMENTS 5,185,790 A  *  2/1993  Mischneko ..................... 16/321
5,383,138 A     1/1995  Motoyama
(Continued)

FOREIGN PATENT DOCUMENTS

JP    4-75693 U    7/1992
JP    6-35565 A    2/1994
(Continued)

OTHER PUBLICATIONS

International Search Report, mailed Aug. 19, 2008, issued in corresponding International Patent Application No. PCT/JP2008/001102, filed Apr. 25, 2008.

*Primary Examiner* — Jeffrey O Brien
(74) *Attorney, Agent, or Firm* — Seed IP Law Group PLLC

(57) ABSTRACT

An attempt is made to miniaturize and reduce a thickness of a folding type portable terminal.
There are provided a turning shaft member 51 having a shaft section 58; a friction member 54; an urging member 55; and a bearing member 52 including an accommodation section 63 for accommodating the friction member 54 and the urging member 55 and an insertion hole 62 which is in mutual communication with the accommodation section 63 and which retains the shaft section 58 in a turnable manner. The urging member 55 urges the friction member 54 when predetermined deflection is imparted to the urging member 55. The urged friction member 54 contacts an outer periphery of the shaft section 58 and also urges the outer periphery of the shaft section 58. The shaft section 58 of the turning shaft member 51 is configured so as to turn while generating sliding friction against the friction member 54 and the bearing member 52.

5 Claims, 17 Drawing Sheets

U.S. PATENT DOCUMENTS

| | | | |
|---|---|---|---|
| 5,537,713 A * | 7/1996 | Docteur | 16/380 |
| 5,564,772 A * | 10/1996 | Miller | 16/342 |
| 5,752,293 A | 5/1998 | Lowry | |
| 5,761,300 A * | 6/1998 | Domoleczny | 379/433.13 |
| 6,038,739 A | 3/2000 | Katoh | |
| 6,317,928 B1 * | 11/2001 | Guillemette | 16/380 |
| 6,321,416 B1 * | 11/2001 | Lu | 16/374 |
| 6,671,929 B1 * | 1/2004 | Lu | 16/342 |
| 6,748,625 B2 * | 6/2004 | Lu | 16/374 |
| 6,763,552 B1 | 7/2004 | Kitamura et al. | |
| 6,807,711 B2 * | 10/2004 | Lu | 16/321 |
| 6,830,280 B2 * | 12/2004 | Sturt et al. | 296/97.9 |
| 7,013,532 B2 * | 3/2006 | Lu et al. | 16/342 |
| 7,107,648 B1 * | 9/2006 | Lu et al. | 16/330 |
| 2002/0138946 A1 * | 10/2002 | Lu | 16/342 |
| 2003/0056327 A1 * | 3/2003 | Lin et al. | 16/342 |
| 2006/0000060 A1 * | 1/2006 | Lu et al. | 16/340 |
| 2006/0185123 A1 | 8/2006 | Kuramochi | |

FOREIGN PATENT DOCUMENTS

| | | |
|---|---|---|
| JP | 07-176657 A | 7/1995 |
| JP | 08013899 | 1/1996 |
| JP | 08-1404 U | 9/1996 |
| JP | 8-509041 A | 9/1996 |
| JP | 1047338 A | 2/1998 |
| JP | 3031903 B1 | 2/2000 |
| JP | 2000-240636 A | 9/2000 |
| JP | 200159373 A | 3/2001 |
| JP | 2002-013522 A | 1/2002 |
| JP | 2003-156029 A | 5/2003 |
| JP | 2006-233998 A | 9/2006 |

* cited by examiner

TURNING DEVICE, AND FOLDING TYPE PORTABLE TERMINAL EQUIPPED WITH THE SAME

TECHNICAL FIELD

The present invention relates to a turning device and a folding type portable terminal equipped with the turning device and, more particularly, to a folding type portable terminal that enables a first enclosure to turn in two directions with respect to a second enclosure and a turning device employed in the folding type portable terminal.

BACKGROUND ART

A large number of portable phones have recently been developed and used. However, in relation to the portable phones, various portable phones, such as slide-type portable phones that can be opened and closed by way of a sliding device, folding-type portable phones that can be opened and closed by way of a turning device (a hinge), and the like, as well as straight-type portable phones assuming a simple rod shape, have already been developed.

A first example hinge used in portable equipment includes an open-close shaft reclosably supported by an open-close shaft support section; a rotary shaft rotatably penetrating through the open-close shaft perpendicular to the open-close shaft; angle regulatory pieces provided so as to contact both the open-close shaft support section and the open-close shaft; a regulatory flange projectingly provided on the rotary shaft; a rotation regulatory section that is attached to the open-close shaft support section and that faces the regulatory flange; an open-close shaft retaining plate that is fastened to a tip end of the open-close shaft by caulking, to thus prevent removal of the open-close shaft; and a mounting plate that is fastened to a tip end of the rotary shaft by caulking, to thus prevent removal of the rotary shaft (see; for instance, Patent Document 1). The hinge and portable equipment built from a first enclosure and a second enclosure attached to the hinge are structured such that the first and second enclosures are folded into a closed state and that one enclosure is able to turn in an open state with respect to the other enclosure. When the open-close shaft and the rotary shaft turn, corrugated springs into which the shafts are inserted are compressed, thereby generating predetermined torque.

A second example hinge causes a first enclosure and a second enclosure, which make up portable equipment, to mutually open and close in a first direction parallel to a vertical direction and a second direction parallel to a horizontal direction from a mutually-overlapped close state. The hinge has a first shaft attached to either the first enclosure or the second enclosure; a second shaft attached to a remaining one of the first enclosure and the second enclosure; a base that supports the first shaft and the second shaft so as to be turnable around their respective spindles; a first cam mechanism that controls turning action of the first shaft with respect to the base; a second cam mechanism that controls turning action of the second shaft with respect to the base; and a lock mechanism that locks, except when the first enclosure and the second enclosure are closed and when the first enclosure and the second enclosure are mutually opened in any one direction, opening and closing actions of the first enclosure and the second enclosure in the other direction (see; for instance, Patent Document 2). A compression coil spring into which a shaft is to be inserted is provided along each of an outer periphery of the first shaft and an outer periphery of the second shaft. When the respective shafts turn, predetermined turn torque is generated.

Both of the foregoing hinges used for portable devices are configured such that two enclosures are joined together so as to be able to open and close and turn in a first turning direction in which the two enclosures turn from a closed state in an overlapped manner to an open state and also in another direction in which one enclosure turns with respect to the other enclosure so as to cross the first turning direction at a right angle.

Patent Document 1: Japanese Patent No. 3031903
Patent Document 2: JP-A-2006-233998

DISCLOSURE OF THE INVENTION

Problem that the Invention is to Solve

In the hinge described in connection with the first example, the open-close shaft retaining plate and the mounting plate are fastened by caulking so as to prevent removal of the open-close shaft and the rotary shaft. Caulking is to insert a shaft into a hole made in a plate so as to nominally project out of the hole and to permanently deform the projecting portion by application of pressure, thereby preventing separation of the plate from the shaft. Coupling the shaft to the plate after caulking requires predetermined strength. Predetermined strength referred to herein means strength sufficient for rendering a hinge less susceptible to easy fracture even when a user erroneously dropped a folding type portable terminal equipped with the hinge.

Strength for bonding the shaft to the plate depends on a volume of deformation caused by caulking or a shape resultant from deformation (a thickness, an area, and the like). However, the bonding strength cannot be ascertained without actual facture of the hinge, and hence caulking work is not simple. For these reasons, working procedures and management of product quality achieved after caulking require know-how. In order to stably maintain predetermined coupling strength, it has been difficult to determine where and how to be quantitatively managed after caulking, or a management method has also been difficult.

Both of the hinges described as the first and second examples have coil springs into which spindles to turn are inserted. The coil springs are intended for providing the spindles (shafts) with desired rotational torque. When an average coil diameter and a wire diameter of the coils are reduced (made smaller), desired torque cannot be acquired; therefore, a predetermined average coil diameter and a predetermined wire diameter are necessary.

Miniaturization of the portable terminal of this type has proceeded with a view toward enhancing portability. Incidentally, there may be a case where a portable terminal held in a pocket will be dropped off from the pocket when the user leans forward. A portable terminal resistant to fracture even in such a case is sought. Therefore, in order to prevent the portable terminal from undergoing fracture even when the portable terminal is dropped, a shaft used for a hinge must have a predetermined thickness.

Accordingly, when an attempt is made to realize a coil spring that generates desired torque while permitting passage of a shaft in order to miniaturize a portable terminal, difficulty is encountered in implementing a compact portable terminal because of limitations on miniaturization of a shaft as well as on a reduction in an average coil diameter and a wire diameter.

A hinge of this type inevitably includes a sliding portion. If the sliding portion is not supplied with a lubricant as appropriate, abrasion will arise, which may in turn induce torque fluctuations. Lubricant supply means is required for these reasons, but it has been difficult to build a lubricant supply section without involvement of an increase in the size of the hinge. Specifically, when priority is given to miniaturization, there is a possibility of a life characteristic being sacrificed.

A terminal equipped with a turning device is also set so as to open and close only through a predetermined angle. In this case, the opening and closing actions are realized by limiting the predetermined angle of the turning device or the terminal equipped with the turning device. If the turning device has the function at this time, the angle of the terminal can be regulated by means of only assembling the turning device into the terminal. A terminal development manufacture requires a turning device development manufacture to develop a compact, inexpensive, and high-performance (acquisition of stable torque, and the like) turning device with the aforementioned function.

The present invention has been conceived in view of the circumstance and aims at providing a compact, feasible turning device. Concurrently, the present invention also aims at realizing a long life characteristic and solving many problems by use of, rather than a structure that prevents removal of a shaft by caulking (guarantee of strength fulfilled by a work), a simple structure that does not structurally require special know-how or skills and by means of providing a hinge with a turn angle regulatory function.

The present invention also aims at providing a folding type portable terminal that can avoid an increase in size even when equipped with a turning device, by means of appropriately placing a compact turning device, or the like.

Means for Solving the Problem

A turning device defined in claim 1 of the present invention has a turning shaft member having a shaft section; a friction member; an urging member; and a bearing member including an accommodation section for accommodating the friction member and the urging member and an insertion hole which is in mutual communication with the accommodation section and which retains the shaft section in a turnable manner, wherein the urging member urges the friction member when predetermined deflection is imparted to the urging member; the urged friction member contacts an outer periphery of the shaft section and also urges the outer periphery of the shaft section; and the shaft section of the turning shaft member is configured so as to turn while generating sliding friction against the friction member and the bearing member.

By means of the configuration, actuation force can be imparted to the shaft section in simple structure and with a smaller number of components while an increase in the size of the turning device is avoided. Accordingly, predetermined torque can be produced when the turning shaft member turns.

A turning device defined in claim 2 of the present invention depends on the turning device defined in claim 1 and is characterized by further including a lid member attached to the bearing member so as to cover the accommodation section, wherein the friction member has a first facing section that faces the shaft section and a second facing section that is on the other side of the first facing section and that is imparted with actuation force while facing the urging member; and wherein a predetermined distance is created between the lid member and the second facing section when the lid member is attached to the bearing member, and the actuation force member is placed at any position in the predetermined distance and imparted with predetermined deflection.

By means of the configuration, predetermined actuation force can be imparted to the shaft member by means of only attaching the lid member. As a consequence, predetermined torque can be generated when the turning shaft member turns.

A turning device defined in claim 3 depends on the turning device defined in claim 2 and is characterized in that a first space is created in an area surrounded by the friction member, the shaft section, and the bearing member.

By means of the configuration, it becomes possible to supply sliding surfaces around the shaft section with a lubricant along with turning action of the turning shaft member as a result of the lubricant being provided in the first space.

A turning device defined in claim 4 of the present invention depends on the turning device defined in claims 1 and 3 and is characterized in that the first facing section of the friction member is provided with a plurality of contact sections that contact the shaft section; and a spacing section that is provided between the plurality of contact sections and that is separated from a surface of the shaft section.

By means of the configuration, it is possible to supply a lubricant to the sliding surfaces around the shaft section along with turning operation of the turning shaft member by providing the spacing section with the lubricant.

A turning device defined in claim 5 of the present invention depends on the turning device defined in any of claims 1 through 4 and is characterized in that the shaft section has a cylindrical section and a non-cylindrical section; that the cylindrical section contacts a portion of the insertion hole when the cylindrical section of the shaft section faces the portion of the insertion hole; and a second space is created between the non-cylindrical section and the portion of the insertion hole when the non-cylindrical section of the shaft section faces the portion of the insertion hole.

By means of the configuration, as a result of the lubricant being provided in the second space, the lubricant can be supplied to sliding surfaces around the shaft section along with turning action of the turning shaft member.

A turning device defined in claim 6 of the present invention depends on the turning device defined in any one of claims 1 through 5 and is characterized in that a recess that creates clearance with respect to the outer periphery of the shaft section is provided in vicinity of the portion of the insertion hole.

By means of the configuration, as a result of the lubricant being provided in the recess, the lubricant can be supplied to sliding surfaces around the shaft section along with turning action of the turning shaft member.

A turning device defined in claim 7 of the present invention depends on the turning device defined in any one of claims 1 through 6 and is characterized in that the urging member is a leaf spring formed in a circular-arc shape; and that a flat spacer member is interposed between a pair of leaf springs disposed such that indented sides of the leaf springs oppose each other.

By means of the configuration, even when a pair of urging members undergoes positional deviation (is irregularly positioned) within the accommodation section, actuation force toward the turning shaft member can be generated at all times by means of predetermined deflection.

A turning device defined in claim 8 of the present invention depends on the turning device defined in any one of claims 1 through 7 and is characterized in that the urging member is a leaf spring formed in circular-arc shape; and a pair of urging members arranged such that their concave sides oppose each other is embodied as a superimposed leaf spring that is made by superimposing an additional urging member on each of the convex sides of the leaf springs so that the convex side opposes a corresponding concave side.

By means of the configuration, an urging member capable of increasing load and deflection can be arranged in a narrow space.

A turning device defined in claim 9 of the present invention depends on the turning device defined in any one of claims 1 through 8 and is characterized by further comprising: a ring member attached to the turning shaft member when the shaft section is retained in the insertion hole, wherein the turning shaft member has a third projection protruding in a radial direction of the shaft section; the insertion hole has a projection passage section that allows passage of the third projection when the turning shaft member is situated at a predetermined position; and the ring member is interposed between the third projection and the projection passage section when the insertion hole retains the shaft member.

By means of the configuration, a necessity for caulking work is obviated, and easy removal of the ring member, which would otherwise be caused when subjected to great force, can be prevented.

A turning device defined in claim 10 of the present invention depends on the turning device defined in claim 9 and is characterized in that the turning shaft member has a groove section at a position outside the bearing member when the bearing member retains the turning shaft member; that the groove section is formed such that both ends of the groove section are separated from each other along a direction of a periphery of the shaft section; and that the ring member having an opening and assuming a substantially-C-shaped profile is attached to the groove section.

By means of the configuration, since the ring member can be turned along with the turning shaft member, the projection section can be prevented from passing through the projection passage section even when overlapped with the projection passage section.

A turning device defined in claim 11 of the present invention depends on the turning device defined in any one of claims 1 through 10 and is characterized in that the turning shaft member has a first projection protruding in a radial direction of the shaft section; and that a contact section that contacts the first projection section when the turning shaft member is turned to a predetermined extent while retained by the bearing member is formed at an entrance or exit of the insertion hole of the bearing member.

By means of the configuration, a turning angle of the turning shaft member can be restricted, without addition of a custom-designed member, by means of only the turning shaft member and the bearing member retaining the turning shaft member.

Any of the turning devices defined in claims 1 through 11 is one element for implementing a compact, low-cost, and high-performance turning device. It is better to combine these devices, as appropriate, in terms of selection of materials for constituent components (high-strength materials and inexpensive materials), mechanical design restrictions, and artistic design restrictions.

A folding type portable terminal having a turning device defined in claim 12 of the present invention is characterized by comprising the turning device defined in any one of claims 1 through 10.

By means of the configuration, a folding type portable terminal can be miniaturized in simple configuration.

Advantages of the Invention

According to the present invention, there is realized a hinge that can be miniaturized in a simple structure while an increase in the size of the hinge is avoided.

Further, since a sliding surface can be supplied with a lubricant, a long life characteristic is acquired.

Even when subjected to drop and physical impact, a ring member does not easily come off, and attachment strength of the ring member can be guaranteed by means of manufacturing dimensions of a component. Therefore, drop resistance strength can be assured without depending on variations in caulking work.

Despite space saving, stable actuation force can be imparted to a turning shaft member. Accordingly, it is possible to realize a compact folding type portable terminal that yields many advantages, such as an advantage of the ability to easily generate predetermined torque.

DESCRIPTIONS OF THE REFERENCE NUMERALS AND SYMBOLS

1 MAIN UNIT OF FOLDING PORTABLE PHONE (PORTABLE TERMINAL)

2 UPPER ENCLOSURE
3 LOWER ENCLOSURE
4 JOINT SECTION
28 FIRST HINGE
29 SECOND HINGE
51, 101 TURNING SHAFT MEMBER
52, 102 BEING MEMBER
53, 103 RING MEMBER
54, 104 FRICTION MEMBER
55, 105 URGING MEMBER (SPRING)
62, 114 INSERTION HOLE
63, 115 ACCOMMODATING SECTION
63a OPENING
71, 120 PLANAR SECTION
76a FIRST SLOPE
76b SECOND SLOPE
100 SECOND HINGE
110 THIRD PROJECTION
123a, 123b PROJECTION PASSAGE AREA

BEST MODES FOR IMPLEMENTING THE INVENTION

First Embodiment

A first embodiment of the present invention is hereunder described in detail by reference to the accompanying drawings. Explanations are now provided by applying the invention to a folding portable phone as a joint device of the present invention and a folding type portable terminal equipped with the joint device.

Figure 1:
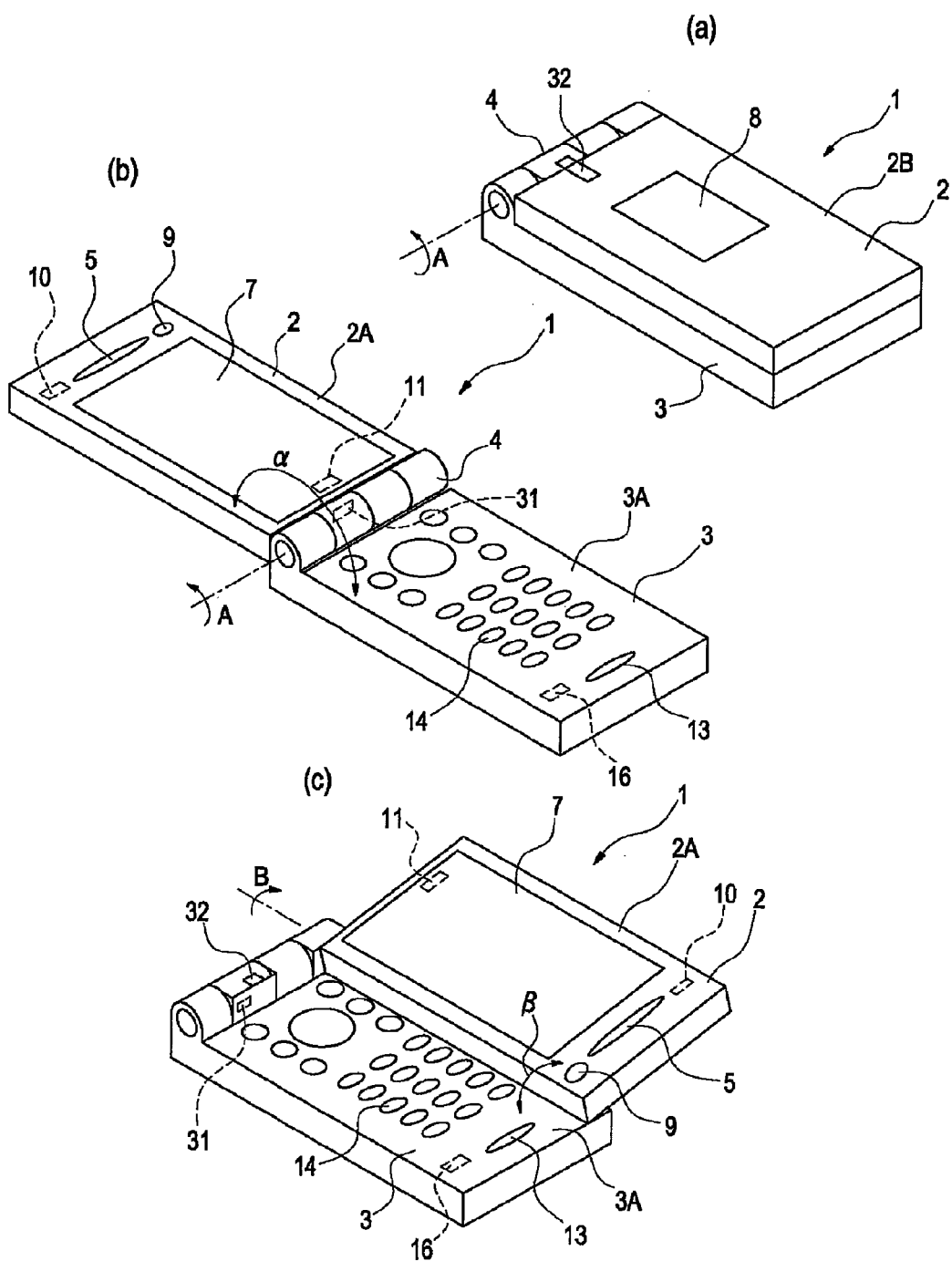
FIG. 1 They are oblique perspective views showing appearance of a folding portable phone of a first embodiment of the present invention and including (a) a closed state, (b) a first open state, and (c) a second open state.
Figure 2:
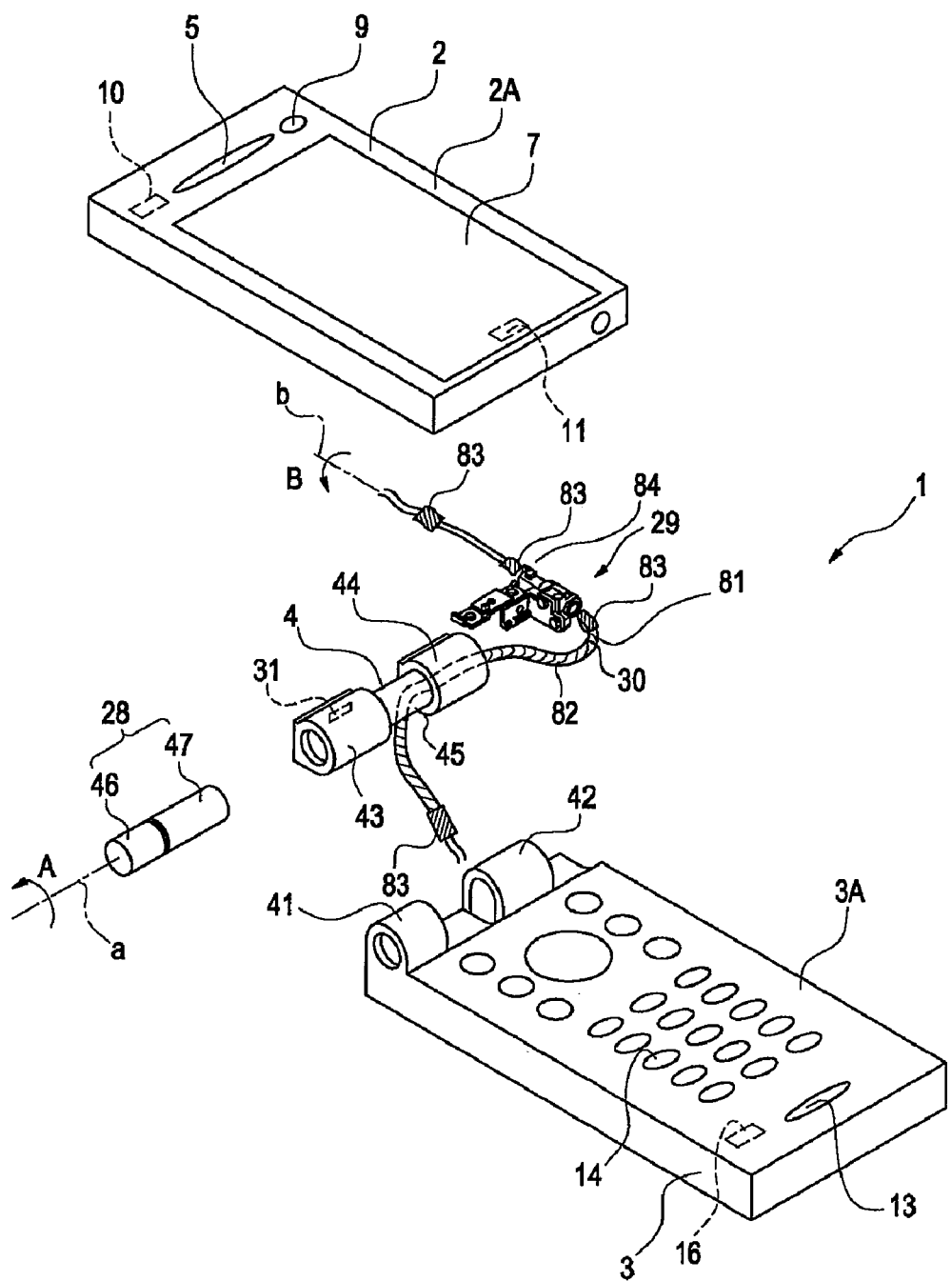
FIG. 2 It is an exploded perspective view of the folding portable phone of the first embodiment of the present invention.
Figure 3:
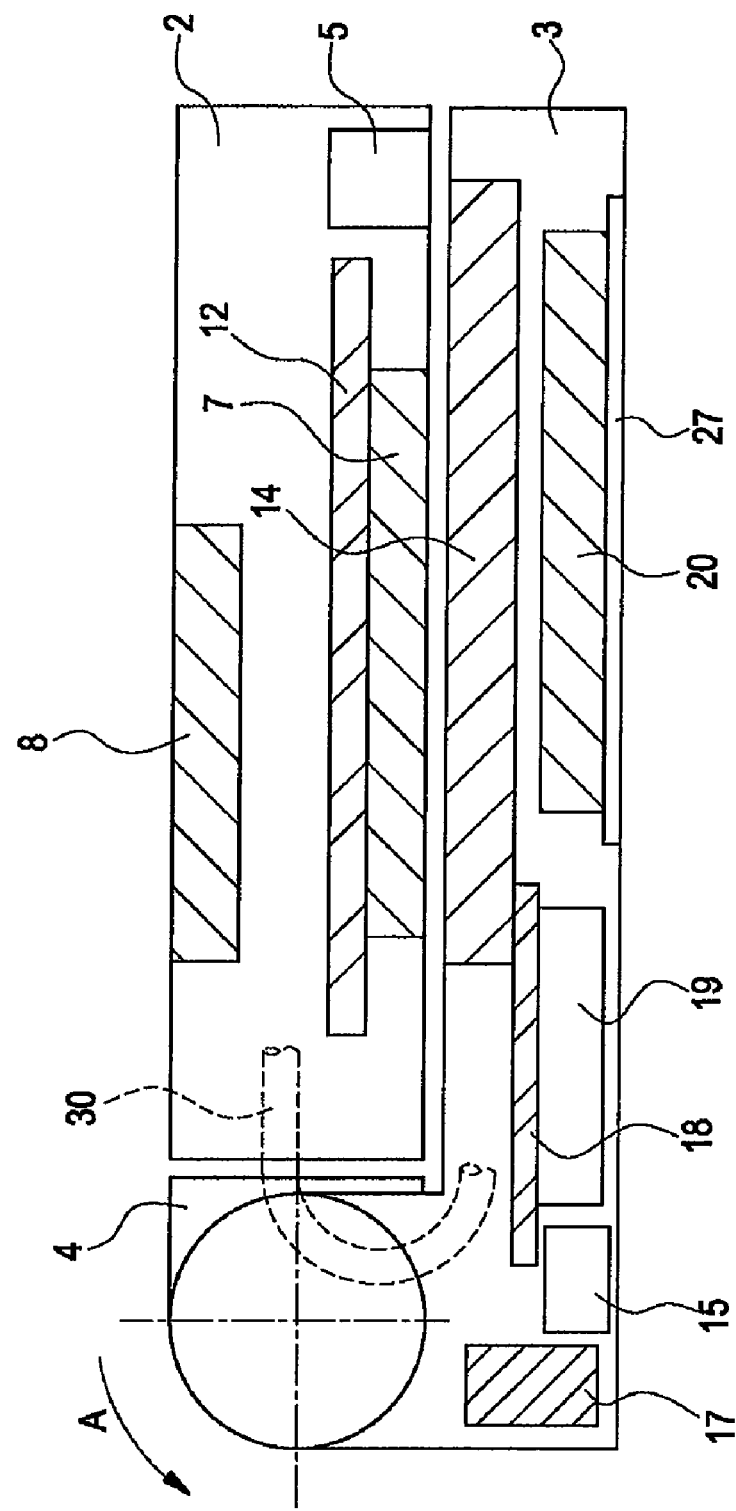
FIG. 3 It is a longitudinal center cross-sectional view of the folding portable phone of the first embodiment of the present invention in a closed state [FIG. 1(*a*)].
Figure 4:
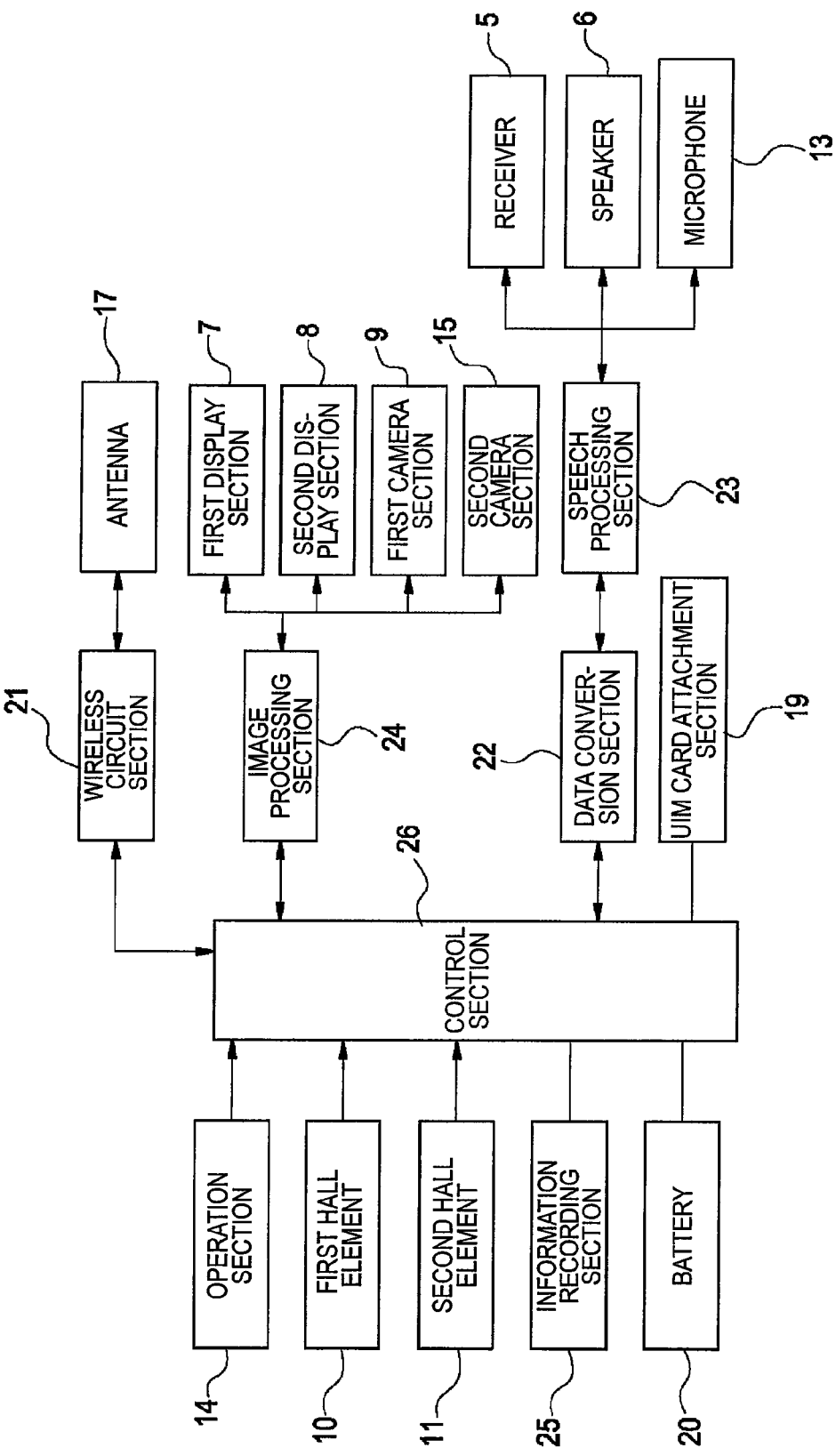
FIG. 4 It is a block diagram of a principal function of the folding portable phone of the first embodiment of the present invention.
Figure 5:
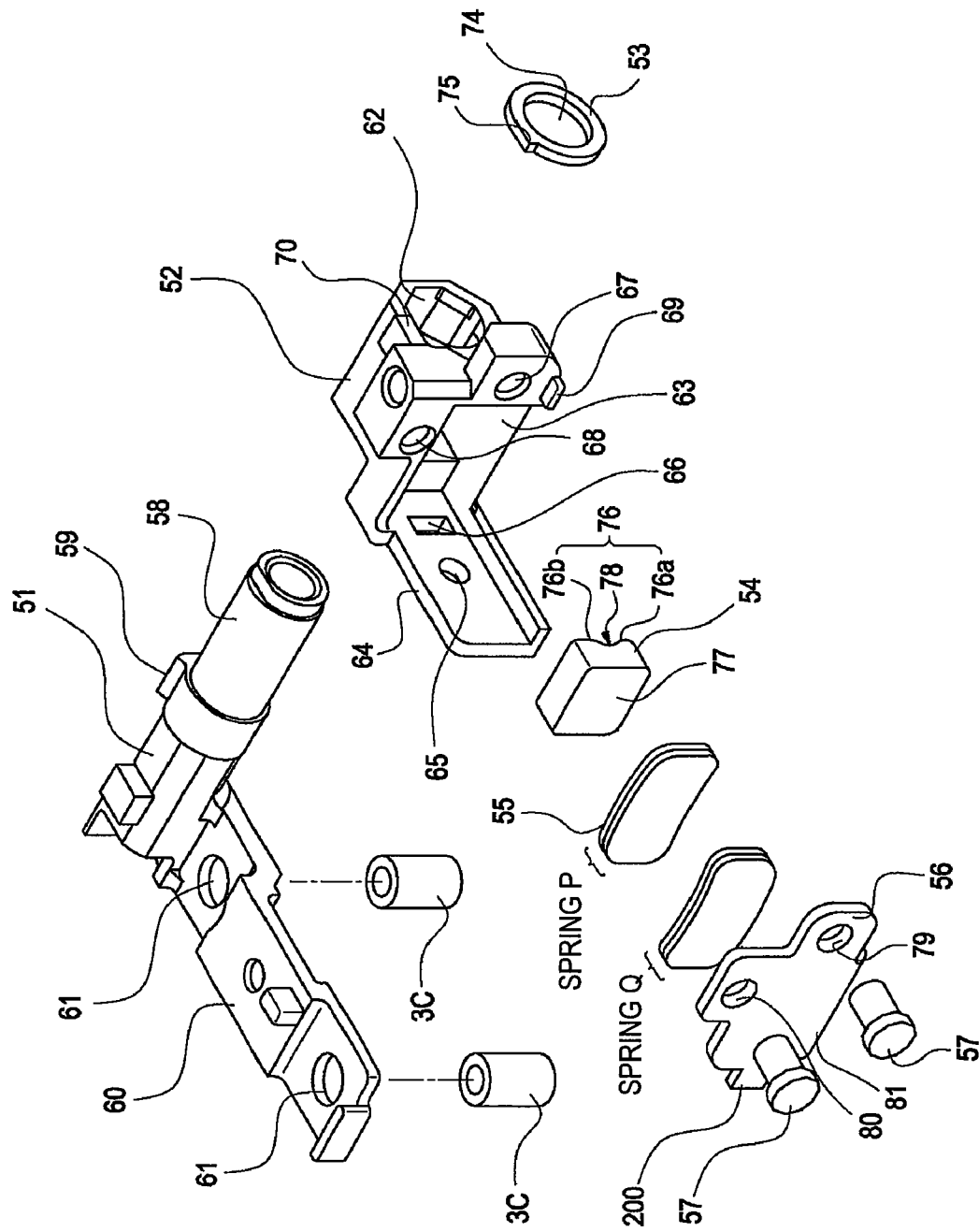
FIG. 5 It is an exploded perspective view of a second hinge of the first embodiment of the present invention.
Figure 6:
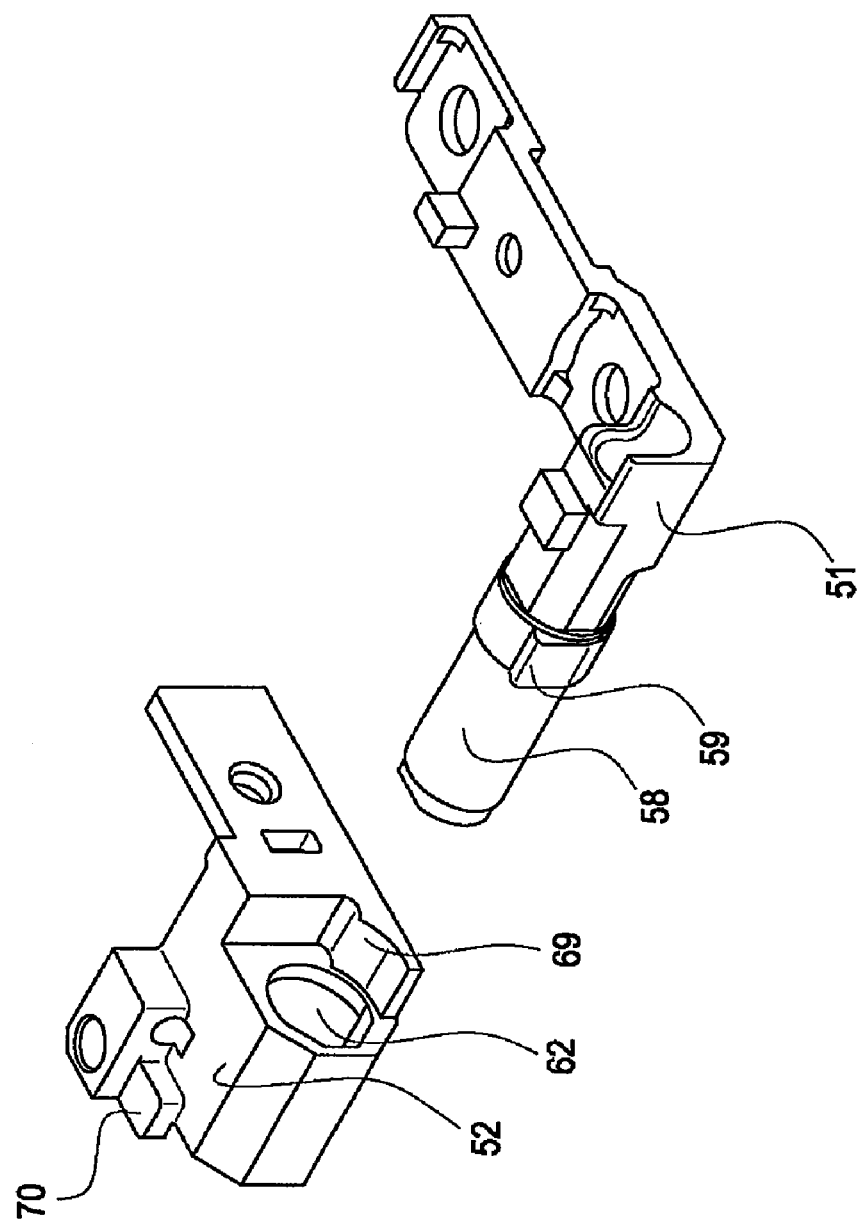
FIG. 6 It is an oblique perspective view of a turning shaft member and a bearing member shown in FIG. 5.
Figure 7:
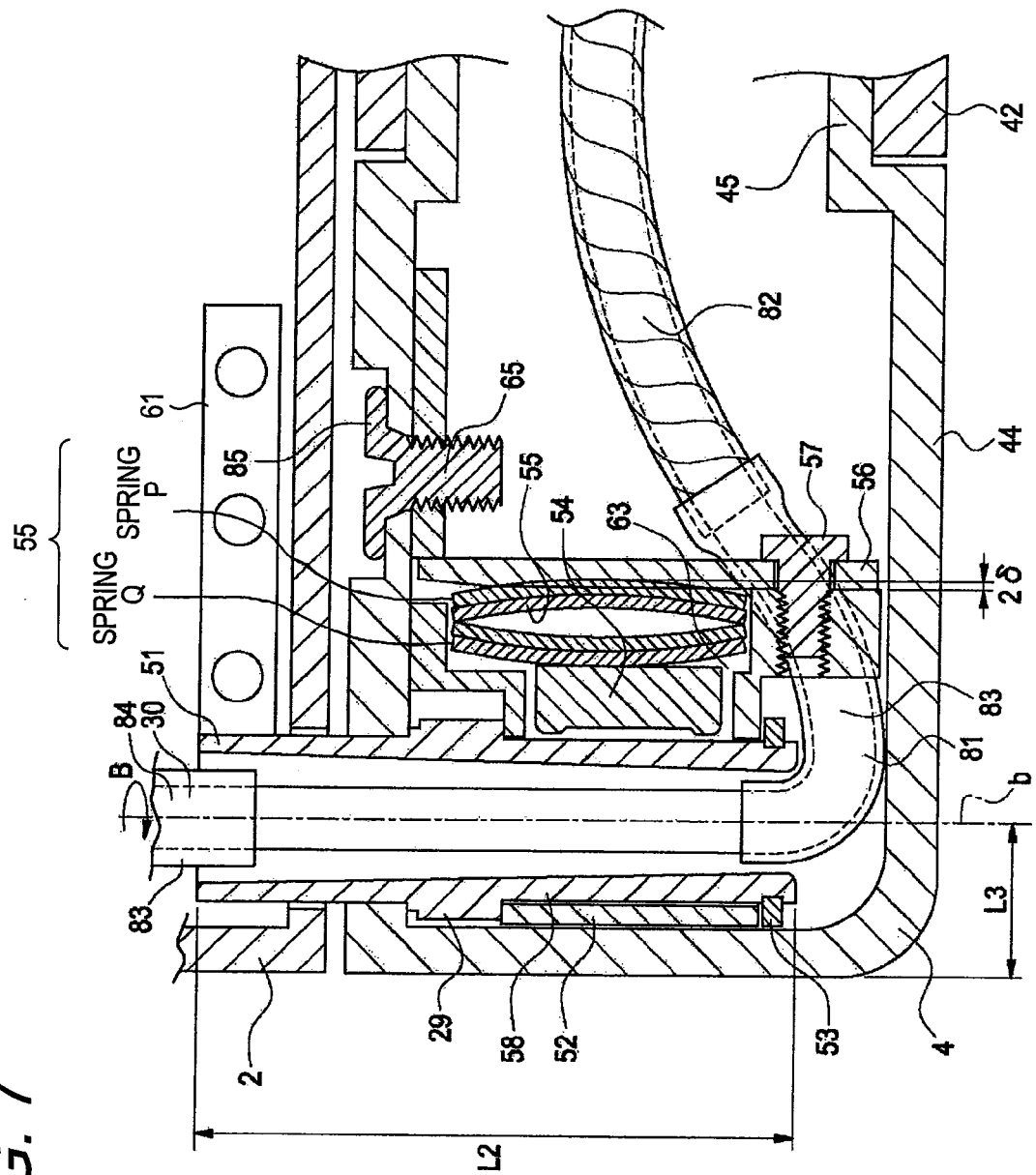
FIG. 7 It is a lateral center cross-sectional view of a joint section of the first embodiment of the present invention.
Figure 8:
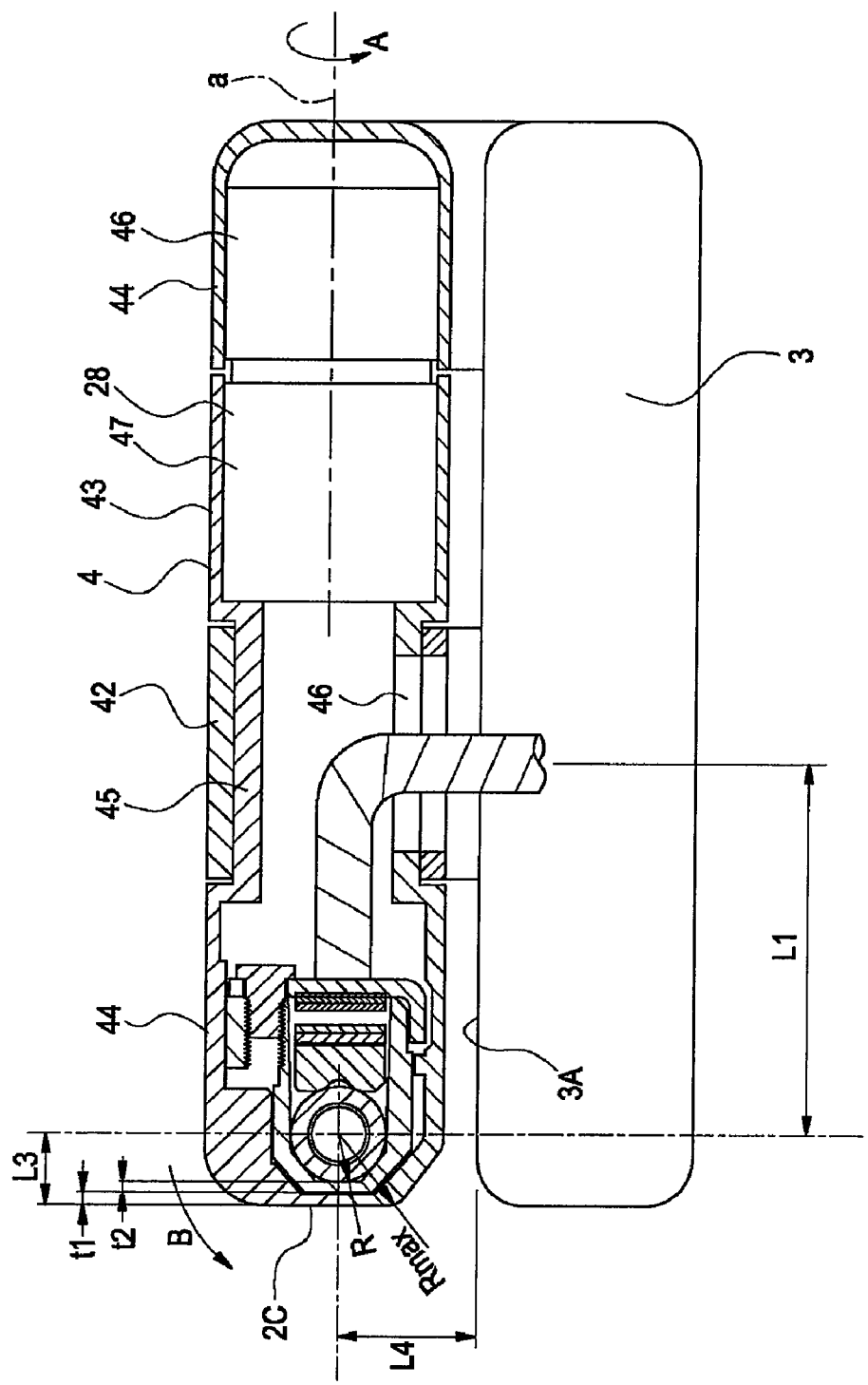
FIG. 8 It is a longitudinal center cross-sectional view of the joint section of the first embodiment of the present invention.
Figure 9:
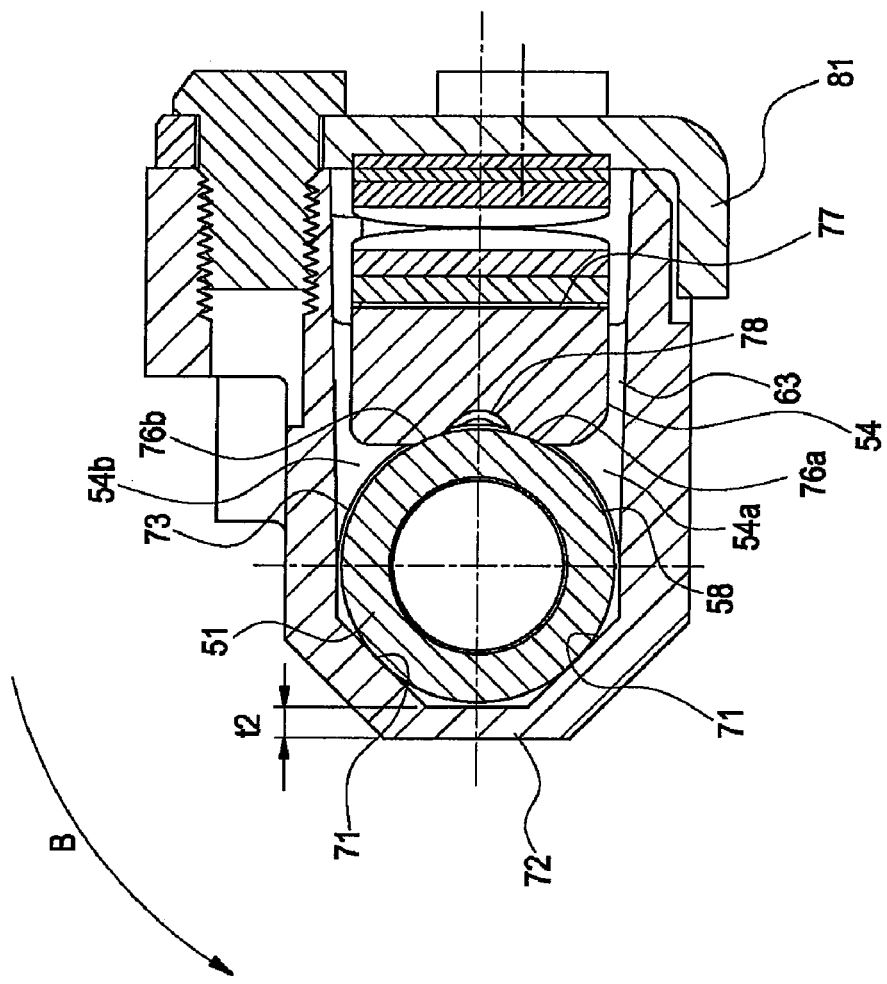
FIG. 9 It is a partially-enlarged view of FIG. 8.
Figure 10:
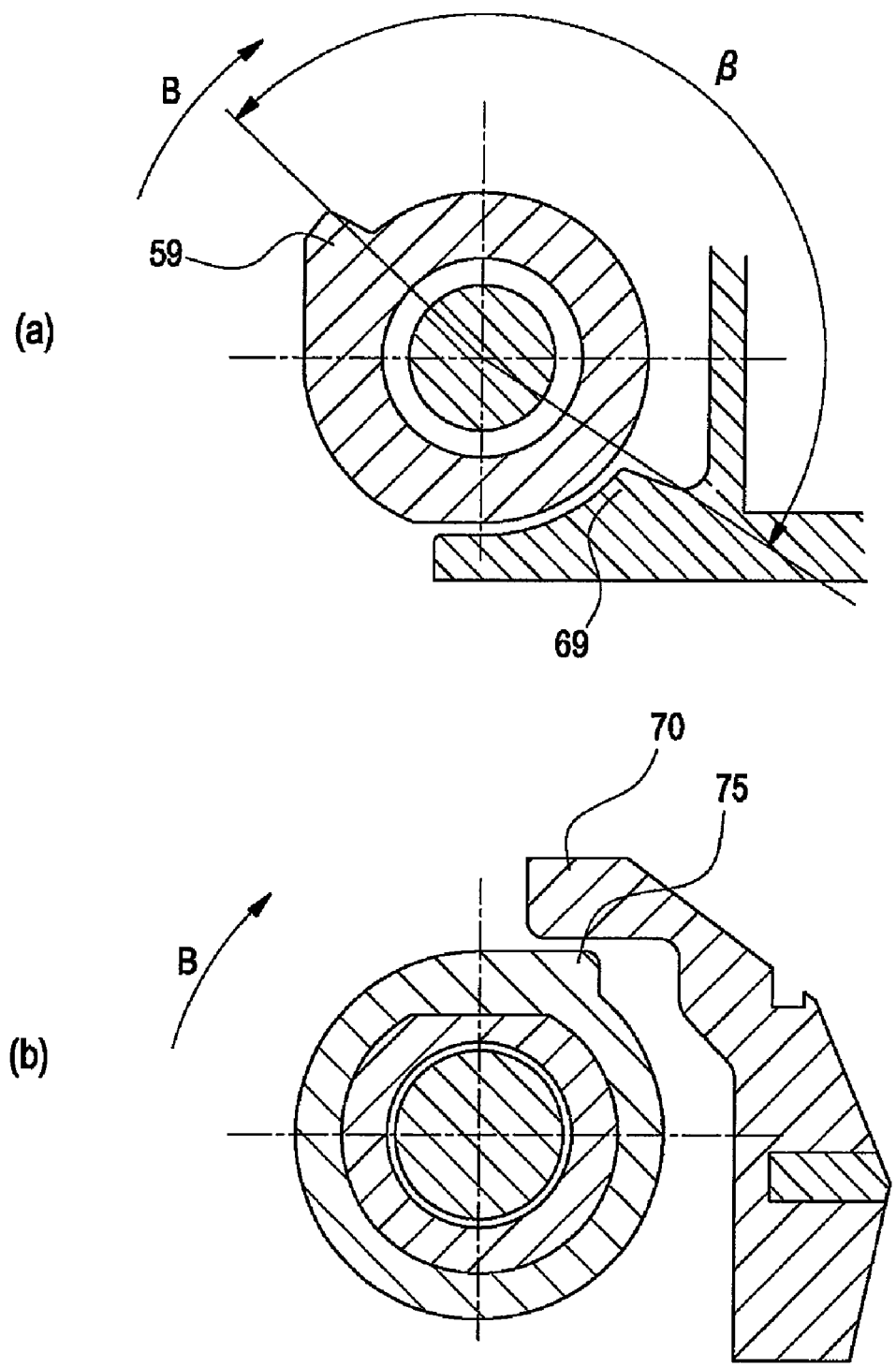
FIG. 10 They are views for describing operation of the turning shaft member of the first embodiment of the present invention, including (a) a cross-sectional view showing a positional relationship between a first projection and a second projection achieved when a main unit is in the first open state and (b) a cross-sectional view showing a positional relationship between a ring member and a rib achieved when the main unit is in the closed state.

FIG. 1 corresponds to oblique perspective views showing appearance of a folding portable phone of a first embodiment of the present invention. FIG. 1(a) shows a closed state; FIG. 1(b) shows a first open state; and FIG. 1 (c) shows a second open state. FIG. 2 is an exploded perspective view of the folding portable phone shown in FIG. 1. FIG. 3 is a center cross-sectional view of the folding portable phone shown in FIG. 1(a). FIG. 4 is a block diagram showing an electrical configuration provided in enclosures of the folding portable phone of the first embodiment of the present invention. FIG. 5 is an exploded perspective view of a second hinge in the folding portable phone of the first embodiment of the present invention. FIG. 6 is an oblique perspective view of a turning shaft member and a bearing member shown in FIG. 5. FIG. 7 is a lateral center cross-sectional view of a joint section in the folding portable phone of the first embodiment of the present invention. FIG. 8 is a longitudinal center cross-sectional view of the joint section in the folding portable phone of the first embodiment of the present invention. FIG. 9 is a partially-enlarged view of FIG. 8. FIG. 10 corresponds to views for describing operation of the turning shaft member provided in the folding portable phone of the first embodiment of the present invention.

As shown in FIGS. 1 and 2, a folding portable phone (hereinafter called a "main unit") 1 of a first embodiment includes, as a general structure, a substantially-box-shaped upper enclosure 2, a substantially-box-shaped second enclosure 3, and a joint section 4 that reclosably couples the upper enclosure 2 to the lower enclosure 3, thereby making up the main unit 1. The main unit 1 is connected so as to be foldable in a direction of arrow A and a direction of arrow B orthogonal to the direction A by means of turning action of the joint section 4.

As shown in FIG. 1(a), the portable phone is used, while carried, with the main unit 1 closed (in a closed state). For instance, when a text, numerals, or a phone number is input while a phone call is in progress, the portable phone is used in a first opened state (a first open state) in which the main unit 1 in a closed state is opened as a result of the upper enclosure 2 being turned with respect to the lower enclosure 3 in the direction of arrow A, as shown in FIG. 1(b). For instance, when a TV program is watched on a landscape screen, the portable phone is used in a second opened state (a second open state) in which the main unit 1 in a closed state is opened as a result of the upper enclosure 2 being turned with respect to the lower enclosure 3 in the direction of arrow B, as shown in FIG. 1(c).

Structural elements belonging to the main unit 1 of the folding portable phone of the first embodiment are now described by reference to FIGS. 3 through 5.

The upper enclosure 2 has a receiver 5, a speaker 6, a first display section 7, a second display section 8, a first camera section 9, a first hall element 10 and a second hall element 11 used as magnetic detectors, and a first printed board 12. The first display section 7 is visibly provided on a principal surface 2A of the upper enclosure 2. The second display section 8 is visibly provided on a back surface 2B opposite to the principal surface 2A.

The lower enclosure 3 accommodates a telephone transmitter (a microphone) 13, an operation section 14, a second camera section 15, a first magnet 16, an antenna 17, a second printed board 18, a UIM card attachment 19, a removable battery 20, and others. A wireless circuit section 21, a data conversion section 22, a speech processing section 23, an image processing section 24, an information recording section 25, a control section 26, and the like, are implemented on the second printed board 18. A feeder section (not shown) is formed, and an antenna 17 is connected to the feeder section. An operation section 14 that becomes exposed when the main unit 1 is in the first or second open state is provided on a principal surface 3A of the lower enclosure 3. A UIM (User Identity Module) card used as an IC card that records personal identification information, such as information about a contractor and a phone number is attached to the UIM card attachment 19 disposed below the battery 20. The UIM card can be replaced (removably inserted) while a battery cover 27 covering the battery 20 and the battery 20 are removed. The battery cover 27 makes up a portion of the back surface 3B opposite to the principal surface 3A.

As shown in FIG. 2, a first joint section (a first turning device or a first hinge) 28 and a second joint section (a second turning device or a second hinge) 29 are fitted to the joint section 4, thereby joining the upper enclosure 2 to the lower enclosure 3 in a turnable fashion. Further, as shown in FIG. 3, a flexible wiring member (a plurality of cables are used in the first embodiment) 30 is let pass through the joint section 4. One end of the wiring member 30 is inserted into a first connector (not shown) placed on a surface of the first printed board 12, and the other end of the wiring member 30 is inserted into a second connector (not shown) placed on a surface of the second printed board 18, thereby electrically connecting the first printed board 12 to the second printed board 18. A second magnet 31 that opposes the second hall element 11 in a closed state and a first open state is also provided in an interior of the joint section 4 as shown in FIG. 2. The joint section 4 also has a lock section 32 that is engaged with the upper enclosure 2 in the closed state and the first open state as shown in FIG. 1(a) and FIG. 1(c). The lock section 32 is disengaged as a result of being slid. When released from an engaged state, the upper enclosure 2 can turn in a direction of arrow B.

The upper enclosure 2 is described in detail by reference to FIG. 1(a) and FIG. 1(b).

The receiver 5 is a first audio output section and outputs voice of an intended party of communication. A user presses the receiver 5 to his/her ear at the time of arrival of a call, thereby catching a voice of the intended party.

The speaker 6 is a second audio output section and outputs incoming call voice, a voice generated in a handsfree mode, a voice generated during view of a TV program, and the like.

When the main unit 1 is in the first or second open state, the first display section 7 displays a sign representing the intensity of a receiving electric field, information about battery power, time information, incoming call information, an input text or symbol, a receiving image, and others.

The second display section 8 becomes exposed on the exterior when the main unit 1 is in the closed state and is oriented in a direction opposite to the direction in which the first display section 7 and the operation section 14 are oriented when the main unit 1 is in the first or second open state. When the main unit 1 is in the closed state, time information or incoming call information appears on the second display section. When there is an incoming call, the user brings the main unit 1 into the first open state and starts call receiving operation. When the main unit 1 is brought into the first open state, text information appearing on the second display section 8 becomes invisible. Even in the second open state, text information, or the like, becomes invisible in the same manner.

The first display section 7 and the second display section 8 are made up of a liquid-crystal display (LCD), an organic EL, and the like, and are connected to the first printed board 12 by means of a display section wiring member made from a flexible printed wiring board, or the like.

The first camera section 9 is placed adjacently to the receiver 5 and captures a user's image during a TV telephone. The image captured at this time is displayed as a mirror image on the first display section 7, and the thus-captured image is transmitted to the intended party along with a voice.

The first hall element 10 is placed at a position along an upper edge of the upper enclosure 2 where the hall element opposes the first magnet 16 when the main unit 1 is in the closed state.

The second hall element 11 is placed at a position along a lower edge of the upper enclosure 2 where the hall element opposes the second magnet 31 when the main unit 1 is in the closed state or the first open state.

The first printed board 12 is placed beneath the first display section 7. The first printed board 12 is electrically connected to the receiver 5, the speaker 6, the first display section 7, the second display section 8, and the first camera section 9. The first hall element 10 and the second hall element 11 are mounted on the first printed board 12.

The lower enclosure 3 is described in detail.

The microphone 13 is provided in the principal surface 3A of the lower enclosure 3 so as to oppose and be covered with the upper enclosure 2 when the main unit 1 is in the closed state and become exposed when the main unit 1 is in the first or second open state. The microphone 13 transits a user's voice to the intended party during conversation.

The operation section 14 is provided in the principal surface 3A of the lower enclosure 3. In order for a phone number and a text to be input, numerals, characters, and symbols are printed in the operation section. The operation section is made up of a plurality of operation buttons that enable receipt and termination of a call, volume control of voice output from the receiver 5 and the speaker 6, switching of a mode to a manner mode, selection and determination of a menu on a menu screen, and the like.

The second camera section 15 is provided on the back surface 3B opposite to the principal surface 3A and adjacently to the printed board 18. The second camera section 15 can capture a rear view of the first display section 7 when the main unit is in the first or second open state. When a subject is situated in front of the user, the user can ascertain a captured image appearing on the first display section 7 while capturing an image of the subject.

Both the second camera section 15 and the foregoing first camera section 9 let captured incident light originating from the subject pass through a group of lenses and also let a photoelectric conversion element, such as a CCD (charge-coupled element), convert the thus-passed light from an optical signal into an electrical signal, thereby generating image information. The image information undergoes processing in the image processing section 24, whereby an image is produced on the first display section 7. The thus-captured image can be recorded in a phone directory along with a phone number. When there is an incoming call from the party whose image is stored, the image correlated with a corresponding phone number is displayed on the second display section 8 when the main unit 1 is in the close state or on the first display section 7 when the main unit 1 is in the first or second open state. When the thus-correlated image is a facial portrait, the calling party can readily be ascertained (at a glance).

To this end, the first display section 7, the second display section 8, the first camera section 9, and the second camera section 15 are connected to the image processing section 24. When predetermined operation is performed, information about the images captured by the first camera section 9 and the second camera section 15 is recorded in the information recording section 25. In addition to recording the image information, the information recording section 25 can also record phone number information, audio information, image information except information about a captured image (received image information, or the like), and text information like an E-mail in preparation and a transmitted/received E-mail.

The antenna 17 is placed on an end of the lower enclosure 2 and beneath the joint section 4. The antenna 17 is a multi-frequency antenna that exhibits a resonance point at a 900-MHz band, a 1.8-GHz band, and a 1.9-GHz band which are bands for a GSM scheme as well as at a 2-GHz band which is a band for the W-CDMA scheme; and enables performance of sending and receiving operation at these four bands.

The second printed board 18 is adjacent to the battery 20 and located around the second camera 15. Connectors (not shown) to be connected to the UIM card attachment 19 and the battery 20 are provided in some area of the second printed board 18.

The control section 26 is connected to the operation section 14, the first hall element 10, the second hall element 11, the wireless circuit section 21, the data conversion section 22, the image processing section 24, and the information recoding section 25 and controls these sections. The control section 26 is connected to the UIM card attachment 19 and the battery 20, as well.

The wireless circuit section 21 is connected to the antenna 17 and configured so as to process data received by the antenna 17 and to output the thus-processed data to the data conversion section 22. The data conversion section 22 is connected to the speech processing section 23, and the speech processing section 23 is connected to the receiver 5, the speaker 6, and the microphone 13, respectively.

Accordingly, the data conversion section 22 converts the received data, which are output from the antenna 17 by way of the wireless circuit section 21 and the control section 26, into audio data and outputs the audio data to the speech processing section 23.

After decoding audio data, to thus generate an audio signal, the speed processing section 23 outputs the signal to the receiver 5 and the speaker 6. The receiver 5 and the speaker 6 output voice appropriate to an audio signal transmitted from the speech processing section 23.

After having encoded the voice received by the microphone 13, to thus generate audio data, the speech processing section 23 outputs the audio data to the data conversion section 22. After converted the input audio data into communication data, the data conversion section 22 outputs the communication data to the wireless circuit section 21. The wireless circuit section 21 processes the thus-received communication data and transmits the processed data as a radio wave for a wireless signal from the antenna 17.

The cable 30 is for electrically connecting the first printed board 12 to the second printed board 18. Under control of the control section 26, there are performed transmission and receipt of a signal used for outputting voice from the receiver 5 or the speaker 6, a signal used for letting the first display section 7 display an image captured by the first camera section 9 or the second camera section 15, and the like.

Explanations are now given to the first hall element 10 and the second hall element 11. Since the first hall element 10 is in close proximity to the first magnet 16 when the main unit 1 is in the close state, the first hall element 10 detects a magnetic field of the first magnet 16 and outputs a detection signal to the control section 26. Further, since the first hall element 10 is separated from the first magnet 16 when the main unit 1 is in the first open state or the second open state, the first hall element 10 is incapable of detecting the magnetic field of the first magnet 16 and hence does not produce a detection signal.

The second hall element 11 is in close proximity to the second magnet 31 when the main unit 1 is in the close state or the first open state and, hence, detects a magnetic field of the second magnet 31 and outputs a detection signal to the control section 26. Since the second hall element 11 is separated from the second magnet 31 when the main unit 1 is in the second open state, the second hall element 11 is incapable of detecting a magnetic field of the second magnet 31 and does not produce a detection signal.

Specifically, when the first hall element 10 detects the first magnet 16 and when the second hall element 11 detects the second magnet 31, the main unit 1 is in the close state. When the first hall element 10 does not detect the first magnet 16 and when the second hall element 11 detects the second magnet 31, the main unit 1 is in the first open state. When the first hall element 10 does not detect the first magnet 16 and when the second hall element 11 does not detect the second magnet 31, the main unit 1 is in the second open state.

When the main unit 1 is brought from the close state into the first open state or the second open state, the operation section 14 and the first display section 17 become exposed, whereupon a light source for illuminating the operation section 14 and a light source for illuminating the first display section 17 are turned on. When operation is not performed for a predetermined period of time, the illumination is extinguished. When the main unit 1 is bought from the open state into the close state, both of the light sources for illuminating the operation section 14 and the first display section 17 are turned off, thereby reducing power consumption.

The joint section 4 is described in detail by reference to FIG. 2 and FIGS. 5 to 9.

First, in FIGS. 2 and 8, a substantially cylindrical first hinge attachment section 41 is provided at an end on one edge of the lower enclosure 3, and a cylindrical guide section 42 is formed at a substantially center point on the edge.

The joint section 4 is made up of a first retaining section 43, a second retaining section 44, and a connection section 45 for connecting the first retaining section 43 to the second retaining section 44. The first retaining section 43 is interposed between the first hinge attachment section 41 and the guide section 42. The first retaining section 43 and the second retaining section 44 are arranged such that the guide section 42 is sandwiched therebetween. A cylindrical first hinge 28 is fitted from the outside of the first hinge attachment section 41 to the first retaining section 43.

The first hinge 28 has a first interlock section 46 and a second interlock section 47 and is attached so as to straddle the first hinge attachment section 41 and the first retaining section 43. The first interlock section 46 and the second interlock section 47 are coupled together in a turnable fashion. In the first hinge 28, as a result of the first interlock section 46 being retained by the first hinge attachment section 41 in an unturnable fashion and the second interlock section 47 being retained by the first retaining section 43 also in an unturnable fashion, the joint section 4 connected to the upper enclosure 2 becomes turnable around a shaft center "a" of the first hinge 28 and with respect to the lower enclosure 3 in a direction of arrow A. The second magnet 31 is in the first retaining section 43. When the main unit 1 is in the close state or the first open state, the second magnet 31 is arranged at a position where it becomes close to and faces the second hall element 11.

The guide section 42 retains the connection section 45 in a turnable fashion. The connection section 45 has a notch 46 (illustrated in FIG. 8), and the cable 30 to be described later passes through the notch.

The second hinge 29 is described in detail by reference to FIGS. 5 through 9.

In FIG. 5, the second hinge 29 is placed in the second retaining section 44. The second hinge 29 is made up of a turning shaft member 51, a bearing member 52, a ring member 53, a friction member 54, an urging member (a spring member) 55, a lid member 56, and two lid member fixing screws 57.

The turning shaft member 51 is made up of a hollow cylindrical shaft section 58, a first projection 59 standing upright on a surface of the shaft section 58 (illustrated also in FIG. 6), a first arm section 60 radially extending from an outer periphery on a leading end side of the shaft section 58, and a plurality of first through holes 61 made in the first arm section 60. The first through holes 61 are jointly fastened and fixed to female screw sections 3C, which are provided in the vicinity of a lower end of the first display section 7 accommodated in the upper enclosure 2, by means of first arm fixing screws (not shown). Therefore, the first arm section 60 is placed in the upper enclosure 2 while projecting out of the second retaining section 44, and the shaft section 58 is placed in the second retaining section 44 while retained by the bearing member 52. FIGS. 7 and 8 show an arranged state of the first arm section and the shaft section.

The bearing member 52 has an insertion hole 62 into which the other end side of the turning shaft member 51 is inserted and which retains the turning shaft member 51 in a turnable fashion; an accommodation section 63 having an opening 63a from which a portion of the outer periphery of the shaft section 58 of the turning shaft member 51 projects when the turning shaft member 51 is inserted into the insertion hole 62 and also having a second arm section 64 that is an extension of one side of the accommodation section 63; a first screw hole 65 and an angular second through hole 66 that are formed in the second arm section 64; a second screw hole 67 and a third screw hole 68 formed in a surrounding area of the accommodation section 63; a second projection (illustrated in FIG. 6) 69 provided in the vicinity of an entrance of the insertion hole 62; and a rib 70 that is provided in the vicinity of an exit of the insertion hole 62 and that is in close proximity to the ring member 53 fixed to the turning shaft member 51 projecting from the insertion hole 62.

Two planar sections 71 forming an angle (a substantially-V-shaped profile) of about 90° are formed on an interior wall of the insertion hole 62. The insertion hole 62 is made up of a longitudinal wall 72 interconnecting respective single ends of the two planar sections 71 and a semicircular section 73 starting from respective remaining ends of the two planar sections 71. The insertion hole 62 is joined to the accommodation section 63 within the bearing member 52. The turning shaft member 51 inserted into the insertion hole 62 is prevented from coming off from the bearing member 52 as a result of the ring member 53 being attached to the other end of the shaft section 58.

The ring member 53 is a flat plate having a D-shaped hole 74 into which the other end of the shaft section 58 is to be fitted and a projecting piece 75 projecting toward an outer periphery.

The friction member 54 is placed in the accommodation section 63 joined to the insertion hole 62. The friction member 54 has a first facing section 76 facing the shaft section 58 and a second facing section (a flat section) 77 that is on the opposite side of the first facing section 76 and that assumes a flat shape and that faces the spring member 55. The first facing section has substantially V-shaped two slope sections 76a and 76b (a first slope section 76a and a second slope section 76b). These two slope sections 76a and 76b contact the shaft section 58. The two slope sections 76a and 76b produce friction against the shaft section 58 when the turning shaft member 51 is turned. An indented first groove section 78 that is spaced apart from the shaft section 58; that can apply (impart) a lubricant (grease) to the shaft section; and that contains the same is provided between the two slope sections 76a and 76b (FIG. 9). Since the first groove section 78 is laid along a thrusting direction of the shaft section 58, grease can be supplied to the two slope sections 76a and 76b contacting the shaft section 58.

Specific explanations are provided by reference to FIG. 9. When the rotary shaft member 51 turns from the closed state of the main unit 1 in the direction of arrow B, the shaft section 58 produces friction against the first slope section 76a and subsequently passes through the first groove section 78. Grease then adheres to the surface of the shaft section 58 facing the first groove section 78. The shaft section 58 supplied with grease produces friction against the second slope section 76b. The turning shaft member 51 can turn until the main unit 1 is brought into the second open state. When the main unit 1 returns from the second open state to the close state, the turning shaft member 51 produces friction against the second slope section 76b and subsequently passes through the first groove section 78. After being supplied with grease from the first groove section 78, the turning shaft member 51 produces friction against the first slope section 76a.

When the friction member 54 is thin, the friction member 54 may be susceptible to deformation by forceful actuation performed by the spring member 55. Further, when the first groove section 78 is made, the friction member 54 becomes easily deformed. In order to let grease adhere to the surface of the shaft section 58 while deformation of the friction member 54 is avoided, it is better to previously apply grease over the surface of the shaft section 58 and to the first space 54a formed between the friction member 54 and the accommodation section 63. When the turning shaft member 51 is turned in the direction of arrow B from the close state of the main unit 1, the grease provided in the first space 54 is supplied from the first space 54a before the shaft section 58 produces friction against the first slope section 76a and subsequently produces friction against the first slope section 76a. Next, the shaft section 58 produces friction against the second slope section 76b. The turning shaft member 51 passed through the second slope section 76b is supplied with grease again in the second space 54b. The turning shaft member 51 can turn while supplied with grease until the main unit 1 is brought into the second open state. The first projection 59 contacts the second projection 69 when the main unit 1 is in the second open state, so that an open angle of the main unit 1 is regulated.

The foregoing operation is reversely performed when the main unit 1 returns from the second open state to the close state.

In the first embodiment, the second projection 69 assumes a projecting shape that contacts the first projection 59. However, the second projection is not always limited to the shape. Specifically, any shape is adopted, so long as the second projection contacts the first projection 59 when the turning shaft member 51 is turned through only a predetermined angle, to thus regulate the turning angle of the turning shaft member 51.

Since the second hinge can regulate the turning angle of the turning shaft member 51 by means of a simple structure as mentioned above, an amount of turning action of the main unit 1 can be regulated by means of only attaching the second hinge to the main unit 1.

In relation to the turning shaft member 51 that repeatedly performs forward turning action and rearward turning action, abrasion of the turning shaft member attributable to friction between the slope sections 76a, 76b and the shaft section 58 is lessened as mentioned above by applying grease to the first groove 78 or to the first space 54a and the second space 54b made up of the three components, whereby a reduction in torque fluctuations and prevention of abnormal noise are attained. Specifically, a life characteristic of the turning device is enhanced. Further, the grease supplied to the shaft section 58 is effective for friction produced by the shaft section 58 against the two planar sections 71.

A portion of the outer periphery of the shaft section 58 of the turning shaft member 51 becomes exposed through the opening 63a of the accommodation section 63. A side of the shaft section 58 opposite to its exposed portion contacts the first slope section 76a and the second slope section 76b. The spring member 55 contacts the planar section 77.

The spring member 55 is formed by imparting a curvature R to a substantially rectangular metal thin plate, and a plurality of spring members are used. In the first embodiment, four spring members are used to provide predetermined torque. First, two thicknesses of the spring members 55 oriented in the same direction are superimposed such that a convex side of one spring member and a concave side of the other spring member face each other (to thus produce a so-called laminated spring, and a resultant spring is taken as a spring P). The laminated spring is accommodated in the accommodation section 63 such that an exterior side of a circular arc contact the planar section 77 of the friction member 54. FIGS. 7 through 9 show the state of the spring P accommodated in the accommodation section 63.

The remaining two spring members are accommodated in the accommodation section 63 while the orientation of the spring P is inverted (taken as a spring Q) such that a concave of the spring Q is arranged opposite the concave of the spring P. Provided that load achieved by the single spring member 55 with deflection δ is F, load achieved by the double-ply spring P at deflection δ comes to about 2F. Springs are provided in a so-called parallel layout. Likewise, load achieved by the spring Q at deflection δ is also 2F. When the spring P and the spring Q are superimposed in mutually opposite directions, load achieved at deflection 2 δ comes to 2F. The spring P and the spring Q are arranged in a so-called serial layout.

An increase in deflection of the spring members 55 and large load are attained while stress developing in the spring members 55 is reduced by combination of the serial layout and the parallel layout. When the stress developing in the spring members is a predetermined level or less, each of the spring P and the spring Q can also be made from a single spring member, and the springs can also be superimposed in mutually opposite directions.

Since the space of the accommodation section 63 requires only dimensions sufficient for accommodating the four spring members 55, each of which is made from a thin plate, it becomes unnecessary to increase the dimensions of the space of the accommodation section 63.

For instance, when compression springs are used in place of the springs P and Q, it is necessary to increase a wire diameter and the number of turns in order to diminish stress while load is increased. Since a free height of the compression spring increases in this case, the space of the accommodation section 63 must also be increased. Therefore, in order to generate great actuation force while attaining space saving, the laminated spring method is preferable as described in connection with the first embodiment.

In relation to the layout of the spring P and the spring Q, when the end of the spring P and the end of the spring Q do not mach each other and when predetermined load is hardly acquired by means of predetermined deflection (in contrast to a state, as shown in FIG. 7, where both ends of the springs P and Q substantially match each other; for instance, a state where ends of one spring contact a circular arc of the other spring), it is desirable to interpose a flat plate between the spring P and the spring Q.

The lid member 56 covers the spring P and the spring Q and has an insert section 200 formed at an end so as to project, a second hole 79 and a third hole 80 that screws for fastening the lid member 56 pass through, and a curved part 81. The accommodation section 63 accommodates the spring P and the spring Q. Further, the insert section 200 is inserted into the second through hole 66, and the lid member fixing screws 57 are let pass through the second hole 79 and the third hole 80, to thus be screw-engaged with the second screw hole 67 and the third screw hole 68, respectively. The lid member 56 is thereupon fixed to the bearing member 52. FIGS. 7 and 8 show a state in which the lid member 56 is fixed to the bearing member 52.

When the lid member 56 is fixed to the bearing member 52, a predetermined distance between the flat section 77 of the friction member 54 and the lid member 56 is maintained. When the spring P and the spring Q are put in a space of predetermined distance, the spring P and the spring Q undergo a predetermined amount of deflection, thereby urging the friction member 54 toward the turning shaft member 51. The slope section 76 of the friction member 54 is brought in close contact with the turning shaft member 51, whereupon the turning shaft member 51 urged by the friction member 54 contacts the two flat sections 71. FIG. 7 shows a state achieved before the spring P and the spring Q become deformed. When the lid member 56 is attached, the springs become deformed by an amount corresponding to an interference distance 2δ. When a total amount of deflection of the spring P and the spring Q is 2δ, the springs mutually become substantially flat.

The curved part 81 of the lid member 56 is a bend of one side of the surface of the lid member that the spring Q contacts; and also crosses an area at which the spring Q contacts the lid member 56 (a linear contact area). Reactive force of the spring P and the spring Q acts on the lid member 56, thereby attempting to bend the lid member 56. If the lid member 56 is bent, predetermined deflection 2δ cannot be imparted to the spring P and the spring Q, and the turning shaft member 51 will fail to acquire predetermined turning torque.

For this reason, the curved part 81 is made such that the lid member 56 is not easily bent by reactive force of the spring P and the spring Q, thereby reinforcing the surface of the lid member, which undergoes reactive force of the spring P and the spring Q, so as to become less prone to deformation.

Accordingly, the insert section 200 formed at the end is inserted into the angular hole, thereby attaching the lid member 56 to the bearing member 52 such that the curved part 81 is situated outside the bearing member 52. The lid member 56 is thereby positioned with respect to the bearing member 52. Consequently, the second hole 79 and the third hole 80 substantially match the second screw hole 67 and the third screw hole 68, respectively, while experiencing the reactive force of the spring P and the spring Q. The deflection 2δ can be imparted to the spring P and the spring Q by means of only fastening the lid member through use of the lid member fastening screws 57.

Specifically, enhanced workability is achieved. Since the lid member 56 can be produced from an inexpensive thin plate, the lid member contributes to miniaturization and cost saving of the second hinge 29.

In the second hinge that has been described thus far, the plurality of spring member 55 made from thin plates are superimposed so as to tightly contact each other, whereby predetermined actuation force is given to the shaft section 58 of the turning shaft member 51. Predetermined turning torque develops during turning action. The turning torque is determined from a diameter of the shaft section 58, a coefficient of friction between the bearing member 52 and the shaft section 58, a coefficient of friction between the friction member 54 and the shaft section 58, and actuation force.

When the spring member 55 is formed from a circular coil spring and arranged in numbers, clearance occurs between the plurality of springs, and air holes are created in the respective coils. It is therefore difficult to effectively use a limited space. For this reason, as described in connection with the first embodiment, the manner of superimposing spring members made from thin plates such that the spring members closely contact each other makes it possible to eliminate useless space.

The cable is now described by reference to FIGS. 2 and 7. The cable 30 is inserted into the shaft section 58. One end of the cable is connected to the first printed board 12 (shown in FIG. 3) in the upper enclosure 2. The other end of the cable makes up the curved part (a first exit section) 81 after having exited from the shaft section 58; is guided to the connection section 45 after having passed through the second retaining section 44 in the guide section 42; and exits from the notch 46, to thus be connected to the second printed board 18 in the lower enclosure 3. The cable 30 is formed from a plurality of wires, and a first tape 82 not having an adhesive surface is helically wound around the cable. An adhesive second tape 83 is wound around a leading end and a trailing end of the cable, thereby preventing exfoliation of the first tape 82 from the cable 30. Since the cable 30 does not interfere with another constituent element in the shaft section 58, the plurality of wires do not become separated from each other without winding the cable by means of the first tape 82 and the second tape 83. Accordingly, in order to make the cable easy to twist within the shaft section 58 when the main unit 1 is turned in the direction of arrow B while miniaturization of the second hinge 29 is implemented, the second tape 83 is wound around only neighborhoods of both ends of the shaft section 58, and neither the first tape 82 nor the second tape 83 is wound around the cable 30 in the shaft section 58, thereby miniaturizing the shaft section 58. The bearing member 52 can also be miniaturized, so long as the diameter of the shaft section 58 is reduced. Consequently, the joint section and the portable phone can also be made compact.

At the curved part 81 by way of which the cable 30 exited from the shaft section 58 is guided to the connection section 45, the cable 30 does not experience a twist even when the turning shaft member 51 is turned in the direction of arrow B; hence, friction develops between the turning shaft member 51 and the cable 30. The first tape 82 is therefore wound around the curved part 81 in order to enhance an abrasion resistance characteristic.

Further, even when the turning shaft member 51 is turned in the direction of arrow B, the cable 30 does not become twisted at the second exit section 84 by way of which the cable 30 exited from the shaft section 58 is guided to the upper enclosure 2 because the cable 30 is fastened to the upper enclosure 2. Friction hence develops between the turning shaft member 51 and the cable 30. The second tape 83 is therefore wound around a second exit section 84 in order to enhance an abrasion resistance characteristic.

Specifically, neither the first tape 82 nor the second tape 83 is wound around the cable 30 in the shaft section 58 in such way that the cable becomes easily twisted within the shaft section 58 when the upper enclosure 2 is turned in the direction of arrow B. Further, the first tape 82 and the second tape 83 are wound as appropriate around the cable exited from the shaft section such that the cable does not become separated from each other (dissociated or split).

It is also desirable that a portion of the cable 30 subject to a twist during turning of the turning shaft member 51 be a predetermined position. In relation to the wire of this type, a predetermined wire diameter and a material exhibiting superior bend and flexion resistance performance must be selected so that a break does not arise in the wire even when either a bend stress or a torsional stress acts on the wire. However, if combined stresses act on the wire, a break may arise in the wire earlier than envisaged in design. For this reason, occurrence of a twist in the cable 30 in the upper enclosure 2 is prevented by sandwiching the cable 30 between a plurality of upright ribs (not shown) within the upper enclosure 2. Meanwhile, as mentioned previously, the curved part 81 is formed such that the cable 30 immediately after exiting the turning shaft member 51 is guided to the guide section 42, whereby only the portion of the cable 30 located in the turning shaft member 51 becomes twisted. Thus, there is adopted a structure in which the position of the cable 30 subjected to a twist is limited, and the cable 30 is subjected to a life test. The cable 30 can be optimized by means of a long-life, low-cost material, so long as a material capable of withstanding the turning life test a predetermined number of times is selected.

The portion of the cable 30 located in the upper enclosure 2 does not necessarily be sandwiched. Since the purpose of the cable being sandwiched is to prevent occurrence of a twist in the cable within the upper enclosure 2, the cable can also be bent immediately after exiting from the turning shaft member 51 toward the upper enclosure 2.

Specifically, both portions of the cable 30 exiting from both ends of the turning shaft member 51 are bent, whereby a configuration in which a twist occurs within the turning shaft member 51 is implemented.

When the main unit 1 shifts from the close state that is a carried state to the first open state that is an engaged state, the portion of the cable 30 located in the connection section 45 becomes twisted leftwardly when the first hinge 28 is viewed from the right side. Since the first tape 82 is wound around the cable 30 in a leftward helical pattern, the helical portion is further wound at this time. On the contrary, if the helical portion is wound rightwardly, the helical portion will be rewound when the main unit shifts from the close state to the first open state. Since the helically wound first tape 82 exhibits no adhesiveness, the first tape becomes separated from the cable 30 when the helical portion is rewound. The thus-separated wires will contact the ribs provided in the joint section 4 as appropriate in design and be occasionally caught by the ribs, to thus be broken. The leftward helical portion prevents occurrence of such a break in the wires.

When the second hinge 29 is arranged such that the accommodation section 63 is oriented toward the first hinge 28, the second arm section 64 extends toward the first hinge section 28. A second arm fixing screw 85 inserted from the upper enclosure 2 is screw-engaged with the first screw hole 65, whereupon the bearing member 52 is fixed to the joint section 4. The first arm section 60 of the turning shaft member 51 is accommodated in the upper enclosure 3, and the first arm section fixing screws (not shown) are screw-engaged, thereby fixing the first arm section.

As mentioned previously, the main unit 1 made up of the foregoing components is built from the upper enclosure 2, the lower enclosure 3, and the joint section 4. The joint section 4 is retained with respect to the lower enclosure 3 by means of the first hinge 28 and the connection section 45 and is also turnable around the shaft center "a" in the direction of arrow A. The upper enclosure 2 is turnable in the direction of arrow B around a shaft center "b" with respect to the joint section 4 by way of the second hinge 29.

If the connection section 45 that connects the first retaining section 43 to the second retaining section 44 is not let pass through the guide section 42 unlike the configuration described in connection with the first embodiment; for instance, if the connection section 45 is formed outside the second retaining section 44 along the lower end of the upper enclosure 2, the joint section will become larger, and the upper enclosure 2 will become smaller correspondingly. Many components, such as the first display section 7 to serve as a main display and the receiver, are usually provided in the upper enclosure 2. It is desirable that the first display section 7 be larger with a view toward displaying a TV image and a captured image. Therefore, if the upper enclosure 2 becomes smaller, the display area must be sacrificed, or the upper enclosure 2 must be increased for arranging components. Consequently, the configuration described in connection with the first embodiment is preferable for the components of the upper enclosure 2 from the viewpoint of assurance of a space.

In the first embodiment, the connection section 45 is placed in the guide section 42. However, the connection section is not limited to this layout. The foregoing working-effect and advantage are yielded, so long as the second hinge, such as that mentioned previously, is used.

Operation of the folding portable phone of the first embodiment of the present invention is now described by reference to FIG. 1. When power of the main unit 1 is turned on, call receiving operation is commenced. The phone can be switched to a camera mode or a TV receiving mode by operation of the operation section 14.

In the camera mode, the mode is switched by starting the second camera section 15. When the second camera section 15 is started, an image captured by the second camera section 15 can be displayed on the first display section 7. When the captured image is desired to be saved, the image can be recorded in the information recording section 25.

When a TV broadcast is received in a TV receiving mode, a TV program can be viewed on the first display section 7. Since the TV image is a landscape screen, it is desirable for the user to view the program on the landscape screen. In this case, the lock section 32 is unlocked when the main unit is in the close state, the upper enclosure 2 is opened with respect to the lower enclosure 3 in the direction of arrow B, thereby bringing the main unit 1 into the second open state. When the operation section 14 is oriented toward the user, the user can view the first display section 7 as the landscape screen. The portable phone is thus brought into a mode suitable for viewing a TV program.

When an incoming call is received in each of the modes, incoming call sound is output from the speaker 6 to notify the user of an incoming call. When the upper enclosure 2 is turned in the direction of arrow A, to thus bring the main unit 1 into the first open state, and when predetermined operation is performed, the user can initiate conversation. User's voice is output from the microphone 13.

When conversation ends, the mode achieved immediately before receipt of the call is resumed.

It is desirable that the main unit be in the close state while carried.

Turning operation of the main unit 1 is now described by reference to FIGS. 7 through 10.

First, FIG. 10(a) of FIG. 10 shows a positional relationship between the first projection 59 and the second projection 69 achieved when the main unit 1 is in the first open state. The first projection 59 is turnable only through a predetermined angle β in the direction of arrow B such that the main unit 1 changes from the closed state to the second open state. When the upper enclosure 2 is turned with respect to the lower enclosure 3 in the direction of arrow B through only the predetermined angle β, the first projection 59 contacts the second projection 69, whereupon any further turning action of the upper enclosure is restricted, so that the main unit is brought into the second open state. The second open state refers to an angle at which the user can easily view the display screen (i.e., a state in which an angle which the principal surface 2A of the upper enclosure 2 forms with the principal surface 3A of the lower enclosure 3 is an obtuse angle). For instance, an angle of about 120° to 170° is appropriate.

Accordingly, the first projection 59 and the second projection 69 allow the upper enclosure 2 to turn from the closed state of the main unit 1 with respect to the lower enclosure 3 through the predetermined angle β in the direction of arrow B and restricts further turning action of the upper enclosure 2 in excess of the predetermined angle β.

FIG. 10(b) shows a positional relationship between the ring member 53 and the rib 70 achieved when the main unit 1 is in a close state. The ring member 53 attached to the other end of the shaft section 58 has no member in a direction in which the projecting piece 75 moves (the direction of arrow B) so that the main unit 1 can turn from the close state to the second open state. When the main unit attempts to turn from the close state in a direction opposite to the direction of arrow B, the projecting piece 75 interferes with the rib 70, thereby restricting turning action of the turning shaft member 51.

Accordingly, the ring member 53 allows the upper enclosure 2 to turn from the close state of the main unit 1 with respect to the lower enclosure 3 in the direction of arrow B, thereby restricting performance of turning action in the direction opposite to the arrow B.

A summary of turning action of the turning shaft member 51 is now provided. When the upper enclosure 2 turns from the closed state of the main unit 1 with respect to the lower enclosure 3 in the direction of arrow B, the upper enclosure can turn through only the predetermined angle β. Even when the upper enclosure attempts to turn in excess of the predetermined angle β, the first projection 59 and the second projection 69 collide with each other, thereby restricting turning action. When the upper enclosure 2 turns from the close state of the main unit 1 with respect to the lower enclosure 3 in the direction opposite to the arrow B, the projecting piece 75 collides against the rib 70, thereby restricting turning action.

Additional explanations are now given to the foregoing restrictions on turning action. In the first embodiment, when the main unit 1 changes its mode from the close state to the second open state, a portion of the back surface 2B of the upper enclosure 2 exposed on the exterior surface in the close state is opened so as to oppose the principal surface 3A of the lower enclosure 3 [see FIG. 1(C)]. If there is no turning angle regulation means that restricts the turning angle of the upper enclosure 2 with respect to the lower enclosure 3, the back surface 2B of the upper enclosure 2 will collide against the principal surface 3A of the lower enclosure, thereby inflicting damage on each other. In particular, enclosure members forming exterior surfaces of the main unit 1 are usually, colorfully painted to enhance fashionableness and a designing characteristic; however, such painting exhibits low flaw resistance and low abrasion resistance. Therefore, if damage is inflicted on the main unit by means of simple repetition of ordinary opening and closing actions, use discomfort may arise.

Therefore, it is possible to restrict the turning angle and prevent occurrence of irregular flaws by providing ribs, or the like, at specific locations on both sides where the back surface 2B of the upper enclosure 2 and the principal surface 3A of the lower enclosure contact each other.

However, some users who place a special emphasis on a designing characteristic may not prefer such a rib. Moreover, when a rib is provided on an exterior surface, ease of gripping action may be deteriorated or the portable phone may often be caught in a pocket while the portable phone is closed. Further, when the portable phone in the first open state is held in one hand during a conversation, the action of reading or writing an E-mail, and the like, the rib may obstruct the hand holding the phone. Thus, it is preferable to eliminate the rib from both the enclosures 2 and 3.

For these reasons, it is desirable that the turn angle regulation means of the portable terminal which enters any of the close state, the first open state, and the second open state be implemented solely by the second hinge 29.

In FIG. 8, when the main unit 1 is opened from the close state in the direction of arrow A, the upper enclosure 2 turns with respect to the lower enclosure 3 around the shaft center "a" of the first hinge 28 through only the angle α. The cable 30 undergoes a twist of only the angle α within the range of a distance L1 at this time. Therefore, since the cable is twisted in the same direction where the first tape 82 is wound, the first tape 82 is not separated from the cable 30. Further, the cable 30 is not subjected to an increase or decrease in bending stress, and only torsional stress primarily develops in the guide section 42. When the main unit 1 returns from the first open state to the close state, operation performed when the main unit changes from the close state to the first open state is reversely performed.

In FIGS. 7 through 9, when the main unit 1 is opened from its close state in the direction of arrow B, the upper enclosure 2 turns around the shaft center "b" with respect to the lower enclosure 3 through only the angle β. The cable 30 undergoes a twist of only the angle β within the range of a distance L2 (L2 is equal to the length of the shaft section 58 and illustrated in FIG. 7) at this time. Further, the cable 30 is hardly subjected to an increase or decrease in bending stress and principally, solely to torsional stress within the shaft section 58. When the main unit 1 returns from the second open state to the close state, operation performed when the main unit changes from the close state to the second open state is reversely performed.

Since the accommodation section 63 is arranged at a position closer to the first hinge 28 as mentioned above, the folding portable terminal of the invention is not different from the related-art folding portable terminal in view of appearance, and a design not involving formation of a special projection or protrusion on an external view of a folding portable terminal can be realized. Even if a contact between the shaft section 58 and the two planar sections 71 is not implemented, the designing characteristic will not be impaired, so long as the foregoing spring layout is adopted. The two planar sections 71 and the two slope sections 76 are brought into contact with the shaft section 58 with a view toward reducing the thickness of the main unit by avoiding concentration of stress at the shaft section and the bearing as mentioned previously. Consequently, it may not be necessary to adopt a structure in which the shaft section is held by the two planar sections 71, so long as a material capable of resisting stress is selected or the longitudinal wall section 72 is set to a thickness exhibiting sufficient strength. If the structure described in connection with the first embodiment is adopted, there will be yielded an advantage of the ability to select a less expensive material and reduce a thickness.

The planar sections 71 and the slope sections 76 include an error or a tolerance in workmanship and hence may not be perfectly flat as illustrated. The shape for these sections is intended for dispersing stress and reducing the thickness of a longitudinal wall, and therefore the sections may be curved surfaces including slight curvatures.

While carrying a portable terminal of this type, the user may erroneously drop the terminal. When the main unit 1 is dropped, impact load acts on the shaft section 58 of the bearing member 51 in a radial direction. For instance, when the impact load acts in such a direction that the shaft section 58 approaches the friction member 54, the spring member 55 is further compressed. A plenty of stress in excess of allowable stress or a plenty of impact load to separate the lid member 56 from the bearing member 52 occasionally acts on the shaft section. Accordingly, the first embodiment employs the structure in which, when large load acts on the shaft section 58 in a radial direction, the two planar sections 71 and the semicircular section 73 receive impact load. Therefore, the spring of a thin plate does not exceed allowable stress. Meanwhile, the bearing member having the two planar sections 71 and the semicircular section 73 are formed in a single piece and do not need to be made as thin as is the spring member. Hence, the bearing member can be set to a thickness that withstands the impact load.

As has been described above, in the folding portable phone of the first embodiment of the present invention, the upper enclosure and the lower enclosure are joined together so as to be turnable around the joint section. The joint section has the first hinge that effects joining operation so as to allow opening and closing actions in the first direction and the second hinge that effects joining operation so as to allow opening and closing actions in the second direction orthogonal to the first direction. The second hinge is made up of a bearing member that retains the turning shaft member in a turnable fashion, a spring member that imparts actuation force to an outer periphery of the turning shaft member, and a lid member. An accommodation section that accommodates the spring member for imparting forceful actuation to the outer periphery of the turning shaft member is formed in the bearing member. The accommodation section is interposed between the turning shaft member and the first hinge so as to become closer toward the first hinge. Space used for arranging the second hinge can thereby be realized in smaller size. Influence on the design of the main unit is thus avoided. It is consequently possible to miniaturize the folding portable phone.

The spring member in the second hinge is configured such that actuation force is imparted to the plurality of springs formed from thin plates solely from one radial direction of the second turning shaft member. Moreover, the spring members can be assembled to such an extent as to be brought into substantially close contact with each other by combination of a serial arrangement with a parallel arrangement, so that the space where the spring members are arranged is also minimized. Since the space where the spring members and the friction member are to be arranged is made up of the bearing member, the second hinge is embodied as a unit in a simple structure. The second hinge capable of being miniaturized is thereby embodied while ease of handling and ease of assembly are enhanced (all you need is to assemble pre-manufactured hinge units in a factory where a main unit is assembled).

Further, grease given to surroundings of the turning shaft member and the cable can be separated from each other by inserting the cable into the turning shaft member. Therefore, application of grease to the cable is prevented while the life characteristic of the second hinge is enhanced.

Although the second hinge has been described as being placed at one end of the joint section, the location is not restricted. When the second hinge is placed at one end, L3 is made small. On the contrary, when the second hinge is placed at a center portion of the joint section, the shaft section can be made narrow by means of the configuration of the second hinge. Hence, an increase in the size of the portable terminal attributable to the thickness of the shaft section and influence on design can be prevented.

By means of the configuration, the structure and configuration of the second hinge prevents an increase in the size of the portable terminal, and a reduction in weight and size of the hinge itself can be sought.

Second Embodiment

A second embodiment of the present invention is hereinbelow described in detail by reference to the accompanying drawings. The second hinge of the second embodiment is a substitute for the second hinge described in connection with the first embodiment. The cable inserted into the second hinge of the second embodiment, and the upper enclosure 2 and the lower enclosure 3 attached to the second hinge are the same as those described in connection with the first embodiment. The second hinge described in connection with the first embodiment and the second hinge described in connection with the second embodiment differ from each other only in terms of the turning shaft member, the bearing member, the ring member, and the friction member. Remaining structural members of these hinges, such as other spring members and the lid member, are substantially analogous to each other, and hence their explanations are omitted.

Figure 11:
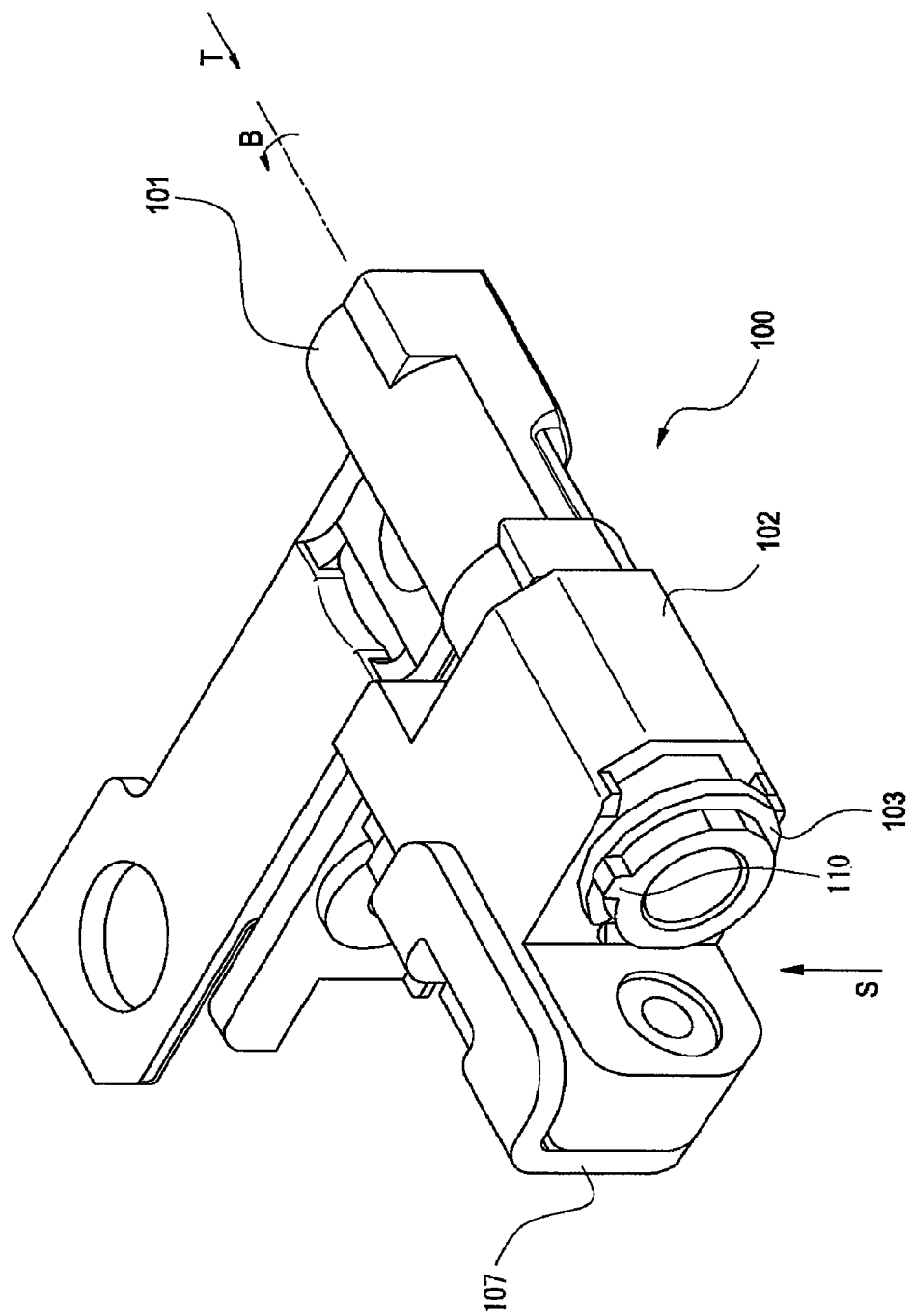
FIG. 11 It is an oblique perspective view of a second hinge of a second embodiment of the present invention.
Figure 12:
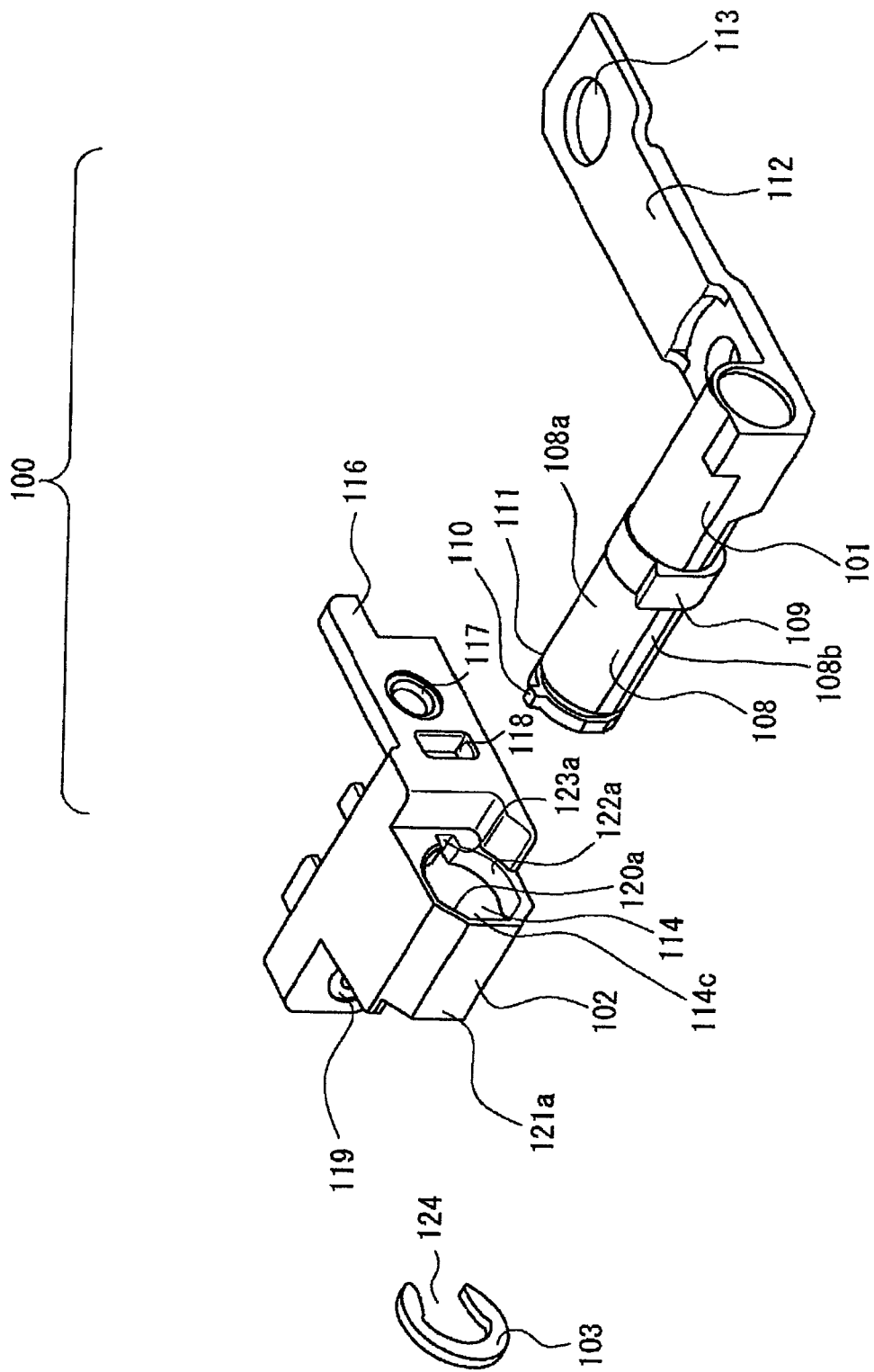
FIG. 12 It is an exploded perspective view of the second hinge of the second embodiment of the present invention.
Figure 13:
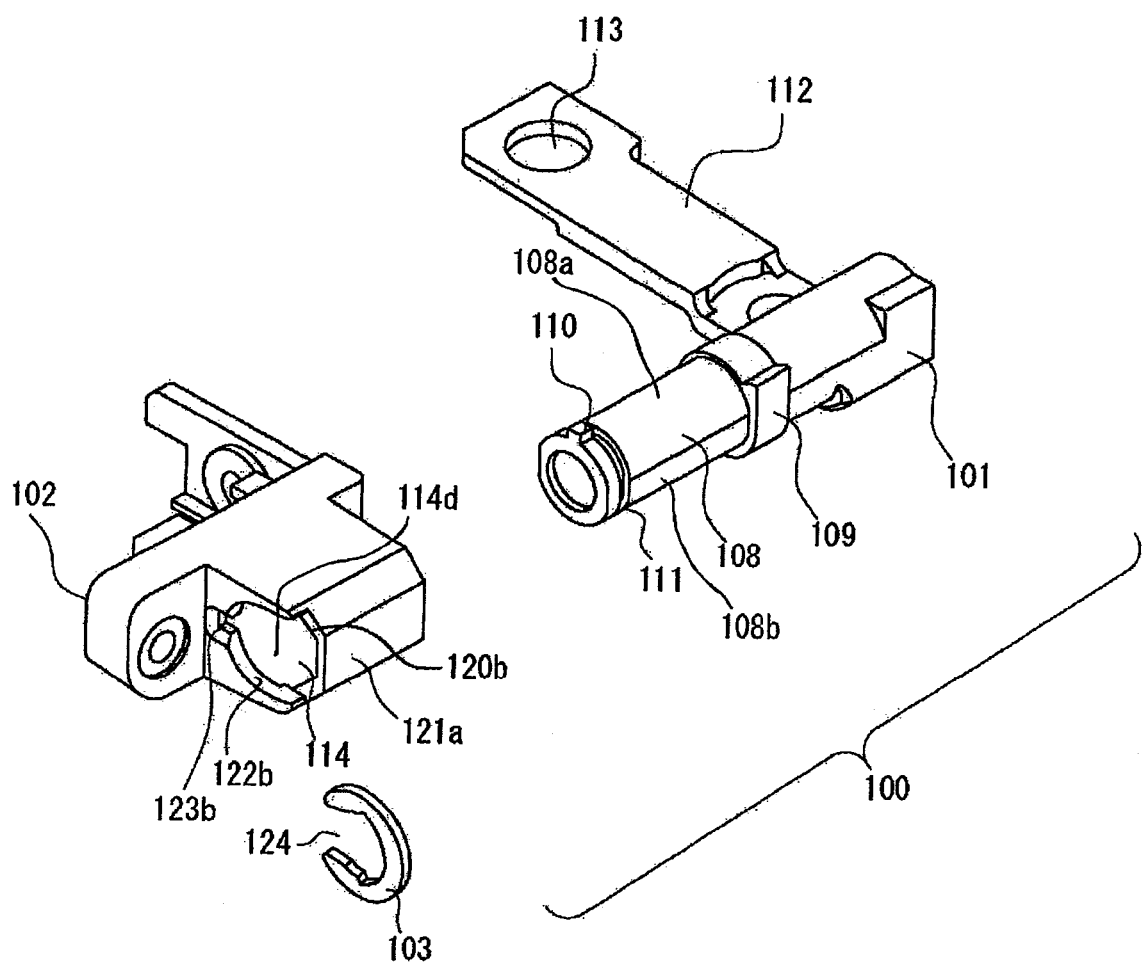
FIG. 13 It is an exploded perspective view achieved when the exploded perspective view shown in FIG. 12 is viewed in another different direction.
Figure 14:
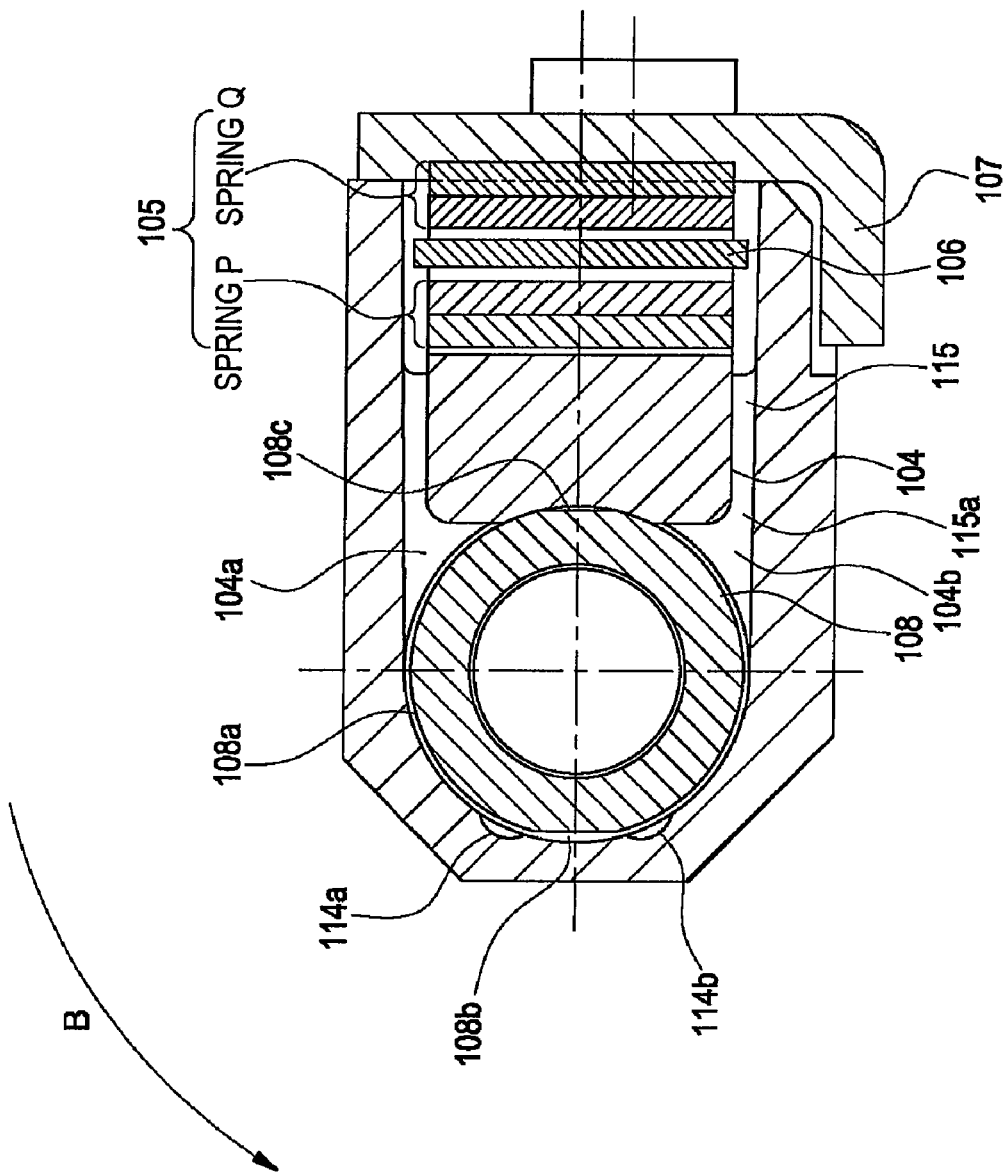
FIG. 14 It is a longitudinal center cross-sectional view of the second hinge of the second embodiment of the present invention.
Figure 15:
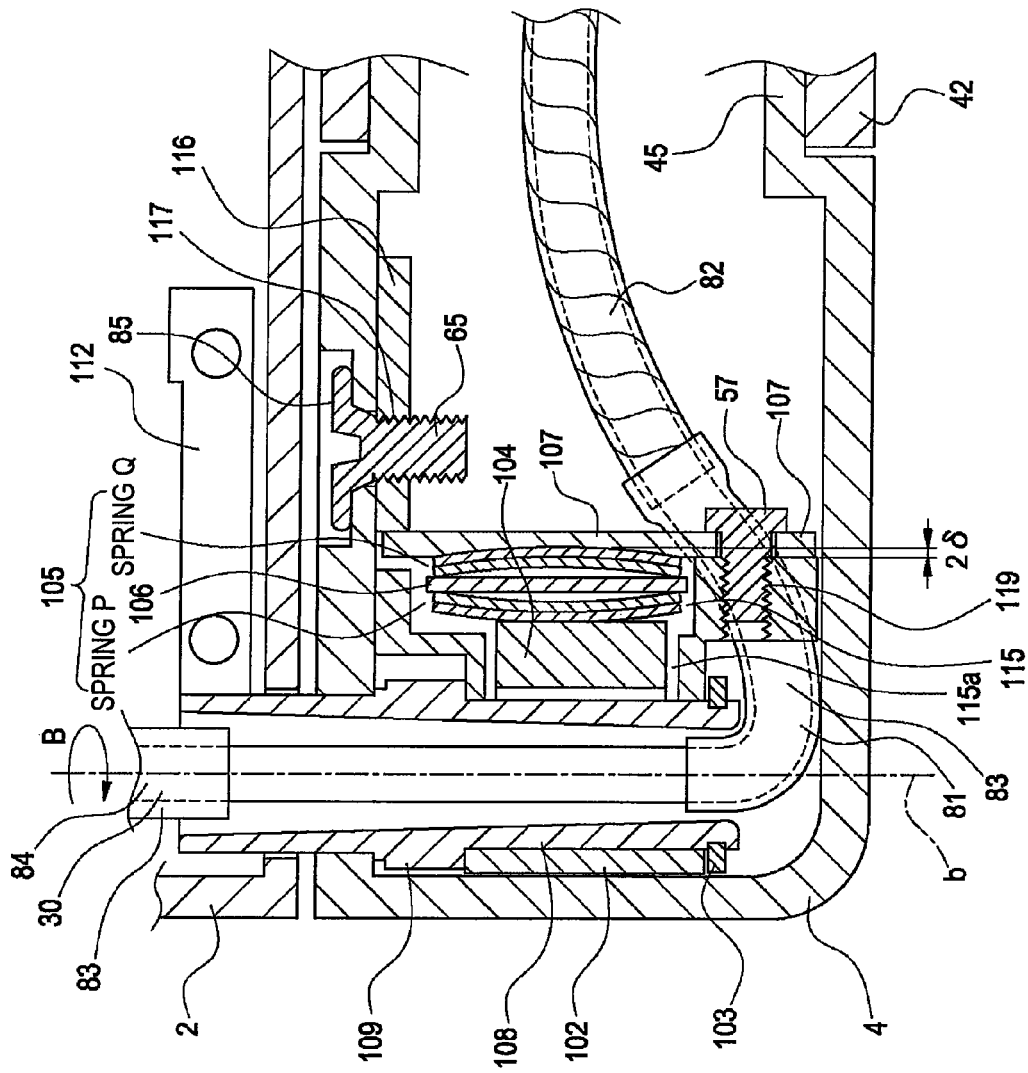
FIG. 15 It is a lateral center cross-sectional view of a joint section of the second embodiment of the present invention.
Figure 16:
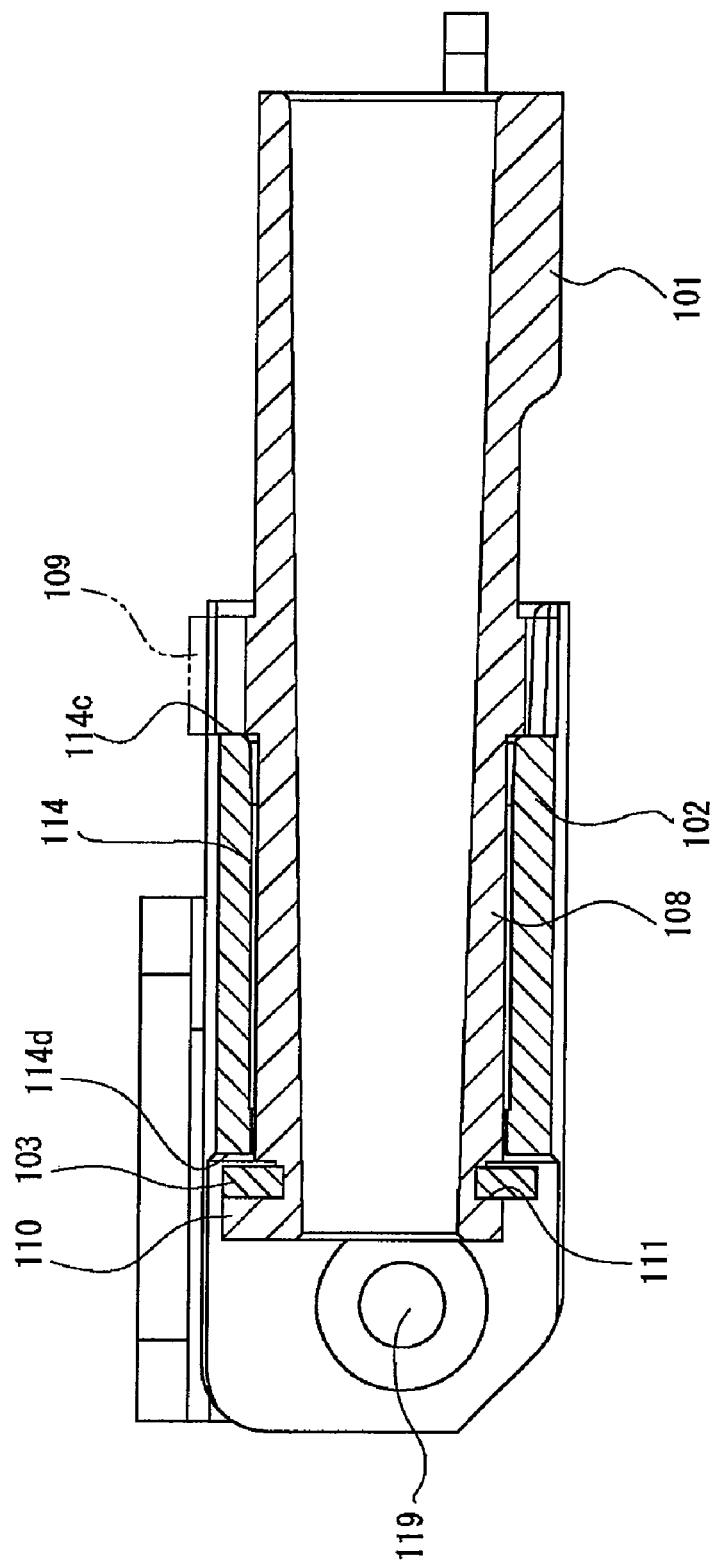
FIG. 16 It is a lateral center cross-sectional view of the second hinge of the second embodiment of the present invention.
Figure 17:
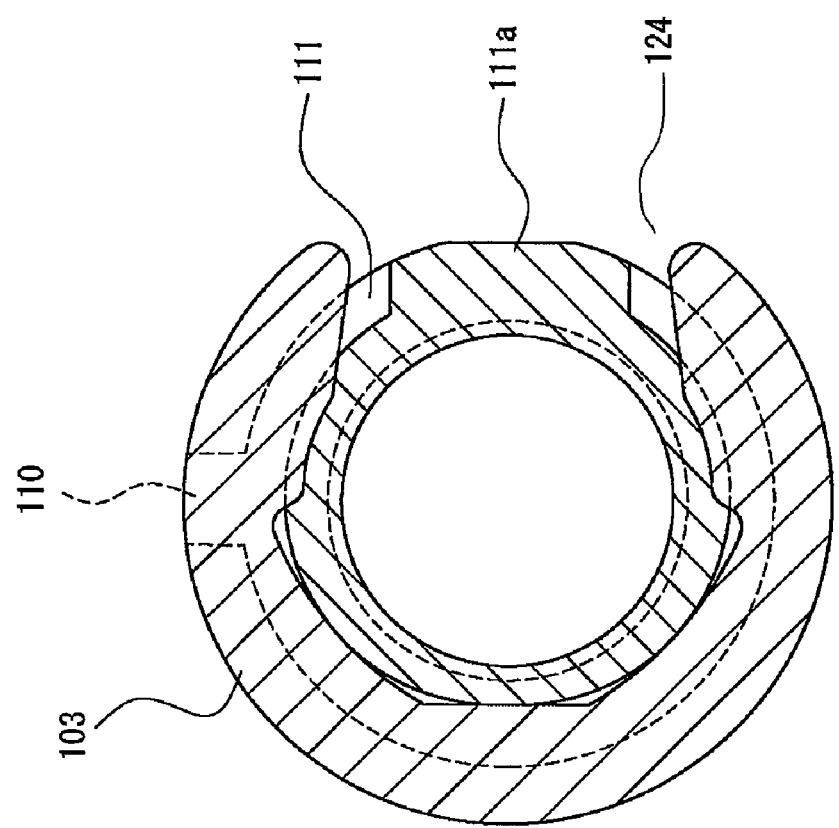
FIG. 17 It is a cross-sectional view of a groove of a turning shaft member making up the second hinge of the second embodiment of the present invention.

FIG. 11 is an oblique perspective view of a second hinge of a second embodiment of the present invention. FIG. 12 is an exploded perspective view of FIG. 11. FIG. 13 is an exploded perspective view achieved when the exploded perspective view shown in FIG. 12 is viewed in another different direction. FIG. 14 is a longitudinal center cross-sectional view of the second hinge of the second embodiment of the present invention. FIG. 15 is a lateral center cross-sectional view of a joint section of the second embodiment of the present invention. FIG. 15 shows that the second hinge shown in FIG. 7 used for describing the first embodiment is replaced with the second hinge described in connection with the second embodiment. FIG. 16 is a lateral center cross-sectional view of the second hinge of the second embodiment of the present invention. FIG. 17 is a cross-sectional view of a groove of a turning shaft member making up the second hinge of the second embodiment of the present invention.

In FIG. 11, a second hinge 100 is made up of a turning shaft member 101; a bearing member 102; a ring member 103; a friction member 104 (illustrated in FIG. 14); spring members 105 used in the second hinge (the spring P and the spring Q illustrated in FIG. 14); a flat spacer 106 (illustrated in FIGS. 14 and 15) that is described in connection with the first embodiment and that is interposed between the spring P and the spring Q; a second lid member 107 made by making a portion of the shape of the lid member used in the second hinge different; and the lid member fixing screws 57 used in the second hinge (the same as those described in connection with the first embodiment). As in the case with the first embodiment, the second embodiment employs the configuration in which the turning shaft member 101 turns while producing sliding (slippage) friction against the bearing member 102 and the friction member 104.

More detailed explanations are now provided by reference to FIGS. 11 through 15. The turning shaft member 101 is made up of a hollow, cylindrical shaft section 108, a first projecting section 109 and a third projection 110 that stand upright so as to project from the shaft section 108 in a radial direction, a groove section 111, a first arms section 112 radially extending from an outer periphery of an end of the shaft section 108, and a plurality of first through holes 113 formed in the first arm section 112. The shaft section 108 has a cylindrical section 108a, and a first non-cylindrical section 108b and a second non-cylindrical section 108c that are formed at positions symmetrical about a shaft center of the shaft section 108.

The bearing member 102 has a circular-arc insertion hole 114 that the other end of the turning shaft member 101 is inserted and that retains the turning shaft member 101 in a turnable fashion, two recesses 114a and 114b (shown in FIG. 14) made in the insertion hole 114, an accommodation section 115 having an opening 115a by way of which a portion of an outer periphery of the shaft section 108 of the turning shaft member 101 becomes exposed when the turning shaft member 101 is inserted into the insertion hole 114, a second arm section 116 that is an extension of one side of the accommodation section 115, a first screw hole 117 and an angular second through hole 118 that are formed in the second arm section 116, and a third screw hole 119 formed around the accommodation section 115.

In FIG. 12 illustrating an entrance 114c of the insertion hole 114, two planar sections 120a that form an angle of about 90° (a substantially-V-shaped profile) are formed at the entrance 114c of the insertion hole 114. The entrance 114c is made up of the a longitudinal wall section 121a that interconnects respective single ends of the two planar sections 120a, a semicircular section 122a starting from the other end of one planar section 120a and extending to the other end of the other planar section 120a, and a notch (a projection passage section) 123a formed in an intermediate area of the semicircular section 122a.

In FIG. 13 illustrating an exit 114d of the insertion hole 114, the exit 114d of the insertion hole 114 is also made up of a semicircular section 122b starting from the other end of one planar section 120b to the other end of the other planar section 120b, and a notch (a projection passage section) 123b formed in an intermediate area of the semicircular section 122b.

In FIG. 14 illustrating a cross section of the insert hole 114, an area of the insertion hole 114 except the entrance 114c and the exit 114d assumes a circular-arc shape and is joined to the accommodation section 115 in the bearing member 102.

The ring member 103 includes a ring opening 124 and assumes a substantially-C-shaped form (i.e., a shape including mutually-separated ends).

An area of the friction member 104 facing the shaft section 108 (equivalent to the first facing section 76 of the first embodiment) has substantially the same curvature as that of the shaft section 108.

As in the first embodiment, third space 104a and fourth space 104b are made up of three components; namely, the bearing member 102, the shaft section 108, and the friction member 104.

The spacer 106 is interposed between the spring P and the spring Q and used for avoiding a potential of predetermined load being hardly obtained by predetermined deflection when ends of the spring P and counterpart ends of the spring Q do not match each other. Specifically, even when respective ends of the spring P and counterpart ends of the spring Q are not located at positions where the end substantially match each other, but the respective ends of the spring P and the counterpart ends of the spring Q are situated on the spacer 106. Therefore, spacing between the respective ends of the spring P and the counterpart ends of the spring Q becomes equivalent to the thickness of the spacer 106. When predetermined deflection is imparted to the spring P and the spring Q, the springs become deformed to such an extent that spacing between a center area of the spring P and the spacer 106 and spacing between a center area of the spring Q and the spacer 106 become smaller. For instance, if the spacer 106 is not provided and if an end of one spring contacts a circular-arc portion of the other spring, for instance one end of the spring P will contact a recess of the spring Q, and the other end of the spring P will not contact any location; otherwise, the center area of the spring P will contact one end of the spring Q. The spring Q will also enter a similar state. As mentioned above, if there is not the spacer 106, the spring P and the spring Q are positionally displaced from each other, and both ends of each of the springs are not supported. As a result, a predetermined amount of deflection is imparted to neither the spring P nor the spring Q. Predetermined actuation force cannot consequently be imparted to the shaft section 108. However, when the rigidity of the spacer 106 is low, the spacer becomes easily deformed by actuation force of the spring P and the spring Q, so that predetermined deflection cannot be imparted to the spring P and the spring Q. Accordingly, in the second embodiment, steel products having substantially the same thickness as the spring P and the spring Q are used in order to avoid occurrence of a state in which predetermined deflection cannot be imparted to the spring P and the spring Q when the spacer 106 becomes deformed by forceful actuation performed by the spring P and the spring Q, thereby preventing occurrence of the foregoing problem.

The spring P and the spring Q referred to in connection with the second embodiment are the same as the spring P and the spring Q described in connection with the first embodiment, and both springs generate substantially identical actuation force and deflection.

FIG. 16 shows a state in which the third projection 110 of the turning shaft member 101 is inserted into the entrance 114c of the insertion hole 114 while aligned to the projection passage section 123a and that the third projection 110 is let pass through the projection passage section 123b. When the first projection section 109 contacts the entrance 114c of the insertion hole 114, the groove section 111 also passes through the exit 114d of the insertion hole 114 (FIG. 15 is a center cross-sectional view, and the first projection 109 is not illustrated in the form of a cross section; hence, the first projection section 109 is illustrated in imaginary line). The ring member 103 is attached to the groove section 111, thereby preventing the turning shaft member 101 from coming off from the bearing member 102.

The first projection section 109 is made different from the projection passage section 123a in terms of a shape, and the first projection 109 is made larger than the projection passage section 123a, thereby preventing the first projection section 109 from fitting into the projection passage section 123a when they overlap each other. When the turning shaft member 101 is inserted into the bearing member 102, insertion of the turning shaft member consequently ends at a predetermined position (i.e., a state in which the first projection section 109 remains in contact with the entrance 114c of the insertion hole 114).

FIG. 17 shows a state where the ring member 103 is fitted around the groove section 111. The groove section 111 is formed such that both ends of the groove section 111 are spaced apart from each other in the direction of a peripheral surface of the shaft section 108, and assumes a substantially-C-shaped profile having a non-groove section 111a. The ring member 103 is fitted around the groove section 111 such that the non-groove section 111a is situated in the opening 124 of the ring member 103.

When fitted around the groove section 111, the ring member 103 becomes slightly broadened than before being fitted, thereby correspondingly nipping the groove section 111. FIG. 16 illustrates a yet-to-be-broadened ring.

Turning actions are now described by reference to FIGS. 11 and 17. Explanations are first given by reference to FIG. 11.

When the insertion hole 114 of the bearing member 102 retains the shaft section 108 of the turning shaft member 101 such that the third projection 110 is oriented in a direction of arrow S (as illustrated FIG. 11), the main unit 1 described in connection with the first embodiment enters the close state. The ring member 103 is attached so as to be situated at a position between the third projection 110 and the exit 114d of the insertion hole 114 such that the opening 124 of the ring member 103 is oriented toward the projection passage section 123b. When an attempt is made to turn the turning shaft member 101 from the state shown in FIG. 11 in the direction of arrow B, the ring member 103 cannot turn with respect to the turning shaft member 101 because the non-groove section 111a stays in the opening 124 of the ring member 103. Specifically, the ring member 103 also turns along with turning action of the turning shaft member 101.

Explanations are now provided by use of FIG. 17 too. When the turning shaft member 101 is turned from the state shown in FIG. 11 through an angle of about 90° in the direction of arrow B, the third projection 110 overlaps the projection passage section 123b. However, the third projection section 110 cannot pass through the projection passage section 123b because of presence of the ring member 103.

Specifically, the ring member 103 is placed at the position between the third projection 110 and the projection passage section 123b that is achieved when the insertion hole 114 of the bearing member 101 retains the shaft section 108 of the turning shaft member 101. Hence, the turning shaft member 101 does not come off from the bearing member 102 during the course of turning action.

There may arise a case where, when the user erroneously dropped the portable terminal, force for letting the turning shaft member 101 come off from the bearing member 102 would be exerted on the second hinge 100. For instance, when the turning shaft member 101 exerts force to the bearing member 102 in a direction of arrow T, the first projection 109 collides against the entrance 114c of the insertion hole 114. The essential requirement for such a case is to appropriately set the thickness of the first projection section 109 such that the first projection section does not become broken. When the turning shaft member 101 exerts force on the bearing member 102 in a direction opposite to the arrow T, the third projection section 110 collides against the exit 114d of the insertion hole 114 by way of the ring member 103. The essential requirement for this case is to set, as appropriate, the thickness of the third projection section 110 so as to prevent collapse of the third projection. Alternatively, the depth of the groove section 111 may also be made greater, thereby letting the groove section 111 receive impact force by way of the ring member 103.

Specifically, it becomes possible to avoid occurrence of a break, which would otherwise be caused by impact force, by making the thickness of the third projection section 110 and the depth of the groove section 111 greater. When the thickness or the depth is insufficient for withstanding impact, all you need is to increase the thickness or the depth as appropriate. Thus, a problem of occurrence of a break can be resolved by means of dimensions of components.

Therefore, hitherto-required management of product quality achieved after caulking becomes unnecessary; hence, manufacturing operation becomes simple, which also leads to cost cutting.

The ring member 103 is placed at the position between the third projection 110 and the projection passage section 123b achieved after the insertion hole 114 of the bearing member 102 retains the shaft section 108 of the turning shaft member 101. Even if drop impact force is exerted on the hinge, removal of the turning shaft member 101 from the bearing member 102, which would otherwise arise when the ring member 103 comes off, is prevented.

Further, the projection passage section 123a is formed in the entrance 114c of the insertion hole 114, and the projection passage section 123b is formed in the exit 114d of the insertion hole 114, so as to enable passage of the third projection section 110 through the insertion hole 114. Therefore, there is realized a structure that does not entail an increase in the number of components and that also prevents deterioration of ease of assembly; for instance, a structure that obviates a necessity for forming the third projection 110 from a custom-designed member and joining the third projection to the turning shaft member 101.

In FIG. 14, when the main unit 1 is in the close state, the first non-cylindrical section 108b faces a circular-arc section of the insertion hole 114 while situated between the two recesses 114a and 114b, and the second non-cylindrical section 108c faces the friction member 104. Grease is supplied to the third space 104a and the fourth space 104b as well as to the first non-cylindrical section 108b, the second non-cylindrical section 108c, and the two recesses 114a and 114b. When the turning shaft member 101 starts turning in the direction of arrow B, the first non-cylindrical section 108b and the first recess 114a overlap each other, whereupon grease is supplied from the first recess 114a to the first non-cylindrical section 108b. The turning shaft member 101 thus turns while grease is being supplied to frictional surfaces between the insertion hole 114 and the shaft section 108. When tuning action is further continued, supply of grease from the third space 104a to the surface of the cylindrical section 108a is continually performed. When the third space 104a faces the first non-cylindrical section 108b, the first non-cylindrical section 108b is also supplied with grease. When the first non-cylindrical section 108b faces the friction member 104, grease is supplied between frictional surfaces of the first non-cylindrical section and the friction member.

Concurrently, grease in the fourth space 104b supplies grease to the cylindrical section 108a, whereby turning action is performed while grease is supplied to frictional surfaces between the cylindrical section 108a and the friction member 104. When the second non-cylindrical section 108c opposes the fourth space 104b, grease is supplied to the second non-cylindrical section 108c.

Abrasion due to friction is lessened as mentioned above by placing a large number of grease supply sources around the shaft section 108. Torque fluctuations are thereby suppressed, and generation of extraneous is prevented. Specifically, a life characteristic of the turning device is enhanced.

Although explanations are omitted from the second embodiment, the cable 30 (shown in FIG. 1) is inserted into the turning shaft member 101 as in the first embodiment. A large amount of grease is provided around the outer periphery of the turning shaft member 101. When there is a chance of grease adhering to the cable 30, the cable 30 requires properties, such as chemical resistance and oil resistance, which may sometimes add to cost. On the contrary, since grease is separated from the cable by the turning shaft members 51 and 101 in the first and second embodiments, there is no chance of grease adhering to the cable 30. An increase in cable cost, which would otherwise be incurred to prevent adhesion of grease, is prevented. Concurrently, it is possible to select grease suitable for a turning life characteristic.

In summary, in the first and second embodiments, the turning device (the hinge) is made up of the turning shaft member, the bearing member, the friction member accommodated in the accommodation section of the bearing member, and the urging member. Preventing an increase in the size of the terminal device and implementing a compact turning device (a hinge) in simple structure are accomplished.

Further, there can be provided a superior hinge that resolves various problems by many contrivances, such as, seeking a stable life characteristic and stable torque through use of a lot of grease supply sources provided despite space-saving and the capability of generating torque despite space-saving during turning of the turning shaft member by combination of a serial layout of thin leaf springs with a parallel layout of thin leaf springs.

The present invention is not limited to the foregoing first and second embodiments at all and can be practiced by selecting a structure using the second hinge in various modes without departing the gist of the invention.

The turning device may also include a turning shaft member having a shaft section; a bearing member including an accommodation section and an insertion hole which retains the inserted shaft section in a turnable manner; an urging member that is accommodated in the accommodation section and that imparts actuation force to the shaft section; and a friction member that is accommodated in the accommodation section so as to be situated between the urging member and the shaft section and that is urged by the urging member to come into contact with the shaft section. A structure may also include a first space that is created in an area surrounded by the friction member, the shaft section, and the bearing member.

By means of the configuration, a lubricant can be supplied to sliding surfaces around the shaft section along with the turning action of the turning shaft member, so long as a lubricant is provided in the first space.

The turning device may also include a turning shaft member having a shaft section; a bearing member including an accommodation section and an insertion hole which retains the inserted shaft section in a turnable manner; an urging member that is accommodated in the accommodation section and that imparts actuation force to the shaft section; and a friction member that is accommodated in the accommodation section so as to be situated between the urging member and the shaft section and that is urged by the urging member to come into contact with the shaft section. The friction member may also have a structure made up by providing the first facing section facing the surface of the shaft section with a plurality of contact sections that contact the shaft section and a spacing section that is provided between the plurality of contact sections and that is spaced apart from a surface of the shaft section.

By means of the configuration, a lubricant can be supplied to sliding surfaces around the shaft section along with the turning action of the turning shaft member by providing the spacing section with a lubricant.

The turning device may also include a turning shaft member having a shaft section; a bearing member including an accommodation section and an insertion hole which retains the inserted shaft section in a turnable manner; and an urging member that is accommodated in the accommodation section and that imparts actuation force to the shaft section. There may also be adopted a structure in which the shaft section has a cylindrical section and a non-cylindrical section; that the cylindrical section contacts a portion of the insertion hole when the cylindrical section of the shaft section faces the portion of the insertion hole; and that a second space is created between the non-cylindrical section and the portion of the insertion hole when the non-cylindrical section of the shaft section faces the portion of the insertion hole.

By means of the configuration, a lubricant can be supplied to sliding surfaces around the shaft section along with the turning action of the turning shaft member by providing the second space with a lubricant.

The turning device may also include a turning shaft member having a shaft section; a bearing member including an accommodation section and an insertion hole which retains the inserted shaft section in a turnable manner; and an urging member that is accommodated in the accommodation section and that imparts actuation force to the shaft section. There may also be adopted a structure in which a recess that creates clearance with respect to the surface of the shaft section is provided in vicinity of the portion of the insertion hole.

By means of the configuration, a lubricant can be supplied to sliding surfaces around the shaft section along with the turning action of the turning shaft member by providing the recess with a lubricant.

The turning device may also include a turning shaft member having a shaft section; a bearing member including an accommodation section and an insertion hole which retains the inserted shaft section in a turnable manner; an urging member that is accommodated in the accommodation section and that imparts actuation force to the shaft section; and a spacer member that is a flat plate greater than the urging member and that is accommodated in the accommodation section. There may also be adopted a structure in which the urging member is a leaf spring formed in a circular-shape geometry; and in which a spacer member is interposed between a pair of leaf springs disposed such that indented sides of the leaf springs oppose each other.

By means of the configuration, even when a pair of urging members undergoes positional deviation (is irregularly positioned) within the accommodation section, actuation force toward the turning shaft member can be generated at all times by means of predetermined deflection.

The turning device may also include a turning shaft member having a shaft section; a bearing member including an accommodation section and an insertion hole which retains the inserted shaft section in a turnable manner; and an urging member that is accommodated in the accommodation section and that imparts actuation force to the shaft section. There may also be adopted a structure in which the urging member is a leaf spring formed in circular-arc profile; and in which a pair of urging members arranged such that their concave sides oppose each other is embodied as a superimposed leaf spring that is made by superimposing an additional urging member on each of the convex sides of the leaf springs so that the convex side opposes a corresponding concave side.

By means of the configuration, an urging member capable of increasing load and deflection can be arranged in a narrow space.

The turning device may also include a turning shaft member having a shaft section; a bearing member including an insertion hole which retains the inserted shaft section in a turnable manner; and a ring member that is attached to the turning shaft member when the shaft section is retained in the insertion hole. There may also be adopted a structure in which the turning shaft member has a projection protruding in a radial direction of the shaft section; in which the insertion hole has a projection passage section that allows passage of the projection when the turning shaft member is situated at a predetermined position; and in which the ring member is interposed between the projection and the projection passage section when the insertion hole retains the shaft member.

By means of the configuration, a necessity for caulking work is obviated, and easy removal of the ring member, which would otherwise be caused when subjected to great force, can be prevented.

The turning device may also include a turning shaft member having a shaft section; a bearing member including an insertion hole which retains the shaft section in a turnable manner; and a ring member that is attached to the turning shaft member when the shaft section is retained in the insertion hole. There may also be adopted a structure in which the turning shaft member has a groove section at a position outside the bearing member when the bearing member retains the turning shaft member; in which the groove section is formed such that both ends of the groove section are separated from each other along a direction of a periphery of the shaft section; and in which the ring member having an opening and assuming a substantially-C-shaped profile is attached to the groove section.

By means of the configuration, since the ring member can be turned along with the turning shaft member, the projection section can be prevented from passing through the projection passage section even when overlapped with the projection passage section.

The turning device may also include a turning shaft member having a shaft section; a bearing member including an accommodation section and an insertion hole which retains the inserted shaft section in a turnable manner; a friction member accommodated in the accommodation section; an urging member that is accommodated in the accommodation section and that imparts actuation force to the friction member; and a lid member that is attached to the bearing member so as to cover the accommodation section. There may also be adopted a structure in which the turning shaft member has a first projection protruding in a radial direction of the shaft section; and in which a contact section that contacts the first projection section when the turning shaft member is turned to a predetermined extent while retained by the bearing member is formed in the vicinity of an entrance or exit of the insertion hole of the bearing member.

By means of the configuration, a turning angle of the turning shaft member can be restricted, without addition of a custom-designed member, by means of only the turning shaft member and the bearing member retaining the turning shaft member.

The foregoing turning devices is also one element for implementing a compact, low-cost, and high-performance turning device. It is better to combine these devices, as appropriate, in terms of selection of materials for constituent components (high-strength materials and inexpensive materials), mechanical design restrictions, and artistic design restrictions.

Moreover, the folding type portable terminal having any of these turning devices enables miniaturization of a folding type portable terminal in simple structure.

The present patent application is based on Japanese Patent Application (JP-A-2007-262394) filed on Oct. 5, 2007 and Japanese Patent Application (JP-A-2007-289989) filed on Nov. 7, 2007, the entire subject matters of which are incorporated herein by reference.

INDUSTRIAL APPLICABILITY

A folding type portable terminal equipped with the turning device of the present invention is provided with a structure in which a friction member is forcefully brought against an outer periphery of the turning shaft that performs turning action. The urging member is of simple structure and placed in narrow space, so that a much smaller hinge is realized. Moreover, the spacers are interposed between the urging members, whereby actuation force is made more stable. Further, a space for storing grease is created in the turning shaft and a bearing member that retains the turning shaft; hence, a life characteristic can be enhanced. Means for preventing the turning shaft meager, which turns, from coming off from the bearing member retaining the turning shaft member is realized by forming a projection on the turning shaft member and placing a ring member between the projection and the bearing member. The turning device of the present invention and the folding type portable terminal equipped with the turning device yield many advantages; namely, cost-cutting of a portable terminal, miniaturization of the portable terminal, avoidance of an increase in the number of the components, and the like. It is preferable to apply the present invention to a turning device for use in a folding type electronic equipment, such as a portable phone, a PDA, a mobile PC, and a notebook PC.

The invention claimed is:

1. A turning device comprising:
    a turning shaft member having a shaft section;
    a friction member;
    an urging member to urge the shaft section from an outer periphery thereof, the urging member comprising a compressed thin-plate member;

a bearing member including an accommodation section to accommodate the friction member and the urging member, and to retain the shaft section in a turnable manner; and a lid member coupled to the bearing member to compress the urging member between the shaft section and the lid member into a substantially flat configuration and to cover the urging member accommodated in the accommodation section, the urging member being compressed by the lid member so as to remain in the substantially flat configuration throughout operation of the turning device, wherein the urging member urges the friction member which is brought into contact with the shaft section when the urging member is compressed between the shaft section and the lid; and wherein the shaft section is configured so as to turn while generating sliding friction against the friction member and the bearing member.

2. The turning device according to claim 1, wherein a lubricant is provided within the accommodation section.

3. The turning device according to claim 1, wherein the turning shaft member has a first projection protruding in a radial direction of the shaft section; and a contact section that contacts the first projection section when the turning shaft member is turned to a predetermined extent while retained by the bearing member is formed in a vicinity of an entrance or an exit of an insertion hole of the bearing member.

4. The turning device according to claim 1, further comprising:

a ring member attached to the turning shaft member, and wherein the turning shaft member has a projection protruding in a radial direction of the shaft section;

the bearing member has an insertion hole with a projection passage section that allows passage of the projection when the turning shaft member is situated at a predetermined position; and the ring member is interposed between the projection and the projection passage section when the insertion hole retains the shaft member.

5. The turning device according to claim 4, wherein the turning shaft member has a groove section at a position outside the bearing member when the bearing member retains the turning shaft member;

the groove section is formed such that opposite ends of the groove section are separated from each other along a direction of a periphery of the shaft section; and the ring member having an opening and assuming a substantially C-shaped profile is attached to the groove section.

* * * * *